United States Patent [19]

Johnson et al.

[11] Patent Number: 4,479,446

[45] Date of Patent: Oct. 30, 1984

[54] SEWING MACHINE SYSTEM HAVING AUTOMATIC IDENTIFICATION AND PROCESSING OF MOUNTED WORK

[75] Inventors: Herbert Johnson; Richard M. Elliott, both of Beverly; Donald F. Herdeg, So. Hamilton; Alan M. Peck, Beverly, all of Mass.

[73] Assignee: USM Corporation, Farmington, Conn.

[21] Appl. No.: 266,298

[22] Filed: May 22, 1981

[51] Int. Cl.³ .............................................. D05B 21/00
[52] U.S. Cl. .......................... 112/121.12; 112/158 E; 112/262.3; 112/266.1
[58] Field of Search ...................... 112/121.12, 121.11, 112/158 E, 158 F, 158 B, 266.1, 262.1, 262.3

[56] References Cited

U.S. PATENT DOCUMENTS

| | | | |
|---|---|---|---|
| 4,056,070 | 11/1977 | Hauf | 112/158 B |
| 4,089,279 | 5/1978 | Hess et al. | 112/121.12 |
| 4,166,423 | 9/1979 | Brienza et al. | 112/158 E X |
| 4,171,671 | 10/1979 | Welcher et al. | 112/121.12 |
| 4,289,084 | 9/1981 | Takenoya et al. | 112/158 E |
| 4,305,338 | 12/1981 | Adamson | 112/121.12 X |
| 4,331,089 | 5/1982 | Widmer | 112/158 F |
| 4,342,271 | 8/1982 | Socha | 112/158 E |
| 4,370,938 | 2/1983 | Bergvall | 112/158 E |

*Primary Examiner*—Peter P. Nerbun
*Attorney, Agent, or Firm*—William F. White

[57] ABSTRACT

A sewing machine system possesses an interactive communication capability allowing for the assignment of stitch patterns with respect to workpieces to be sewn. The workpieces are arranged within pallets having binary codes impressed thereon. The stitch pattern assignments are made in conjunction with the sensing of the binary codes. The workpieces are automatically processed from a location wherein the binary codes are sensed, to a location wherein the pallets are attached to an automatic positioning system. The workpieces are furthermore processed through to an output position when the respectively assigned stitch pattern has been sewn.

102 Claims, 17 Drawing Figures

SEWING MACHINE SYSTEM HAVING AUTOMATIC IDENTIFICATION AND PROCESSING OF MOUNTED WORK

FIELD OF THE INVENTION

This invention relates to the handling of workpieces within an automatic sewing machine system. In particular, this invention relates to the identification and manipulation of pallets containing workpieces within an automatic sewing machine system.

BACKGROUND OF THE INVENTION

Automatic sewing machines which sew workpieces previously arranged within pallets have heretofore been known. Examples of such sewing machine systems are illustrated in U.S. Pat. No. 3,814,038 and U.S. Pat. No. 3,877,405. These automatic sewing machines are capable of automatically sewing a stitch pattern that has been previously stored in the memory portion of the automatic control system.

The stitch pattern is often run continuously each time a pallet is loaded and a start button or pedal is depressed. On the other hand, a different stitch pattern may usually be selected by the operator prior to depressing the start button or pedal. The selection of the different stitch pattern requires a separate communication from the operator to the sewing machine wherein various buttons are depressed so as to identify the different stitch pattern. In either instance, it is necessary to first manually load the pallet into the sewing machine and thereafter manually depress one or more buttons or pedals to identify different stitch patterns and initiate the sewing. It is to be appreciated that this allows for an erroneous entry by the operator of the machine who may be operating a number of machines. The stitch pattern is automatically sewn on the workpiece in accordance with the stitch pattern that has been identified by the operator. The pallet containing the sewn workpiece is thereafter manually removed from the sewing machine following completion of the automatic sewing. Another pallet can only then be manually loaded into the sewing machine.

It is to be appreciated that the time devoted to the manual loading, unloading and identification of appropriate stitch patterns together with the initiating of the automatic sewing can materially affect the overall productivity of an automatic sewing machine. It is also to be appreciated that these various steps all require a timely presence of the operator who may also be responsible for other machines or tasks. Specifically, the operator may also be called upon to remove completed workpieces from pallets as well as arrange new workpieces within pallets. The operator may also be required to attend other machines which may need special attention because of thread breakage or bobbin changing. If the operator must attend to these other tasks, a pallet loading or unloading sequence may not be timely made.

OBJECTS OF THE INVENTION

It is an object of this invention to provide an automatic sewing machine system with the capability to automatically prescribe a stitch pattern to be sewn on a workpiece presented thereto;

It is another object of this invention to provide an automatic sewing machine system with the capability to automatically prescribe a plurality of stitch patterns to be sewn on a plurality of separately presented workpieces;

It is still another object of this invention to provide an automatic sewing machine system with the capability of interactively communicating with the operator for the purpose of arbitrarily defining a plurality of stitch pattern assignments with respect to the separately identifiable workpieces that are presented thereto; and It is a still further object of the invention to provide an automatic sewing machine system with the capability of automatically processing multiple pallets that are separately identified and thereafter associated with arbitrarily assigned stitch pattern files.

SUMMARY OF THE INVENTION

The above and other objects of the invention are accomplished by an automatic sewing machine system having an interactive communication capability with the operator whereby stitch patterns can be arbitrarily assigned to a plurality of pallets that are thereafter automatically processed. The system preferably includes pallet handling apparatus having an input position wherein a pallet is initially placed. The pallet has a pallet code located thereon which is sensed and interpreted by a digital control system resident within the sewing machine system. In accordance with the invention, the operator of the machine arbitrarily assigns a stitch pattern to the initially loaded pallet through an interactive communication with the digital control system. The digital control system is capable of advising the operator if an improper or invalid stitch pattern assignment is being attempted. The digital control is thereafter operative to sequentially process the pallet through to a position wherein the pallet is locked onto a carriage which moves the workpiece under a sewing head in accordance with the stitch pattern that has been selected by the operator. This stitch pattern will be automatically run by the digital control system each time a pallet bearing the same pallet code is locked onto the carriage. This is premised on the operator not interrupting the automatic processing of pallets for the purpose of changing the pallet assignment through further interactive communication with the digital control system.

In accordance with the invention, the operator may arbitrarily assign a plurality of stitch patterns to a plurality of separately identifiable pallets bearing discrete pallet codes. These pallets may be automatically processed through automatic pallet handling apparatus controlled by the digital control system. This automatic processing includes the releasing of the pallet from the carriage and ejecting the pallet in such a manner as to not interfere with the subsequent mating of another pallet with the carriage. The automatic processing mode is maintained as long as the finished pallet is removed from the ejector mechanism and a new pallet is inserted into the input position prior to the completion of the pallet which has been automatically locked onto the carriage.

BRIEF DESCRIPTION OF THE DRAWINGS

The above and other features of the invention will now be particularly described with reference to the accompanying drawings, in which.

DESCRIPTION OF THE PREFERRED EMBODIMENT

Figure 1:
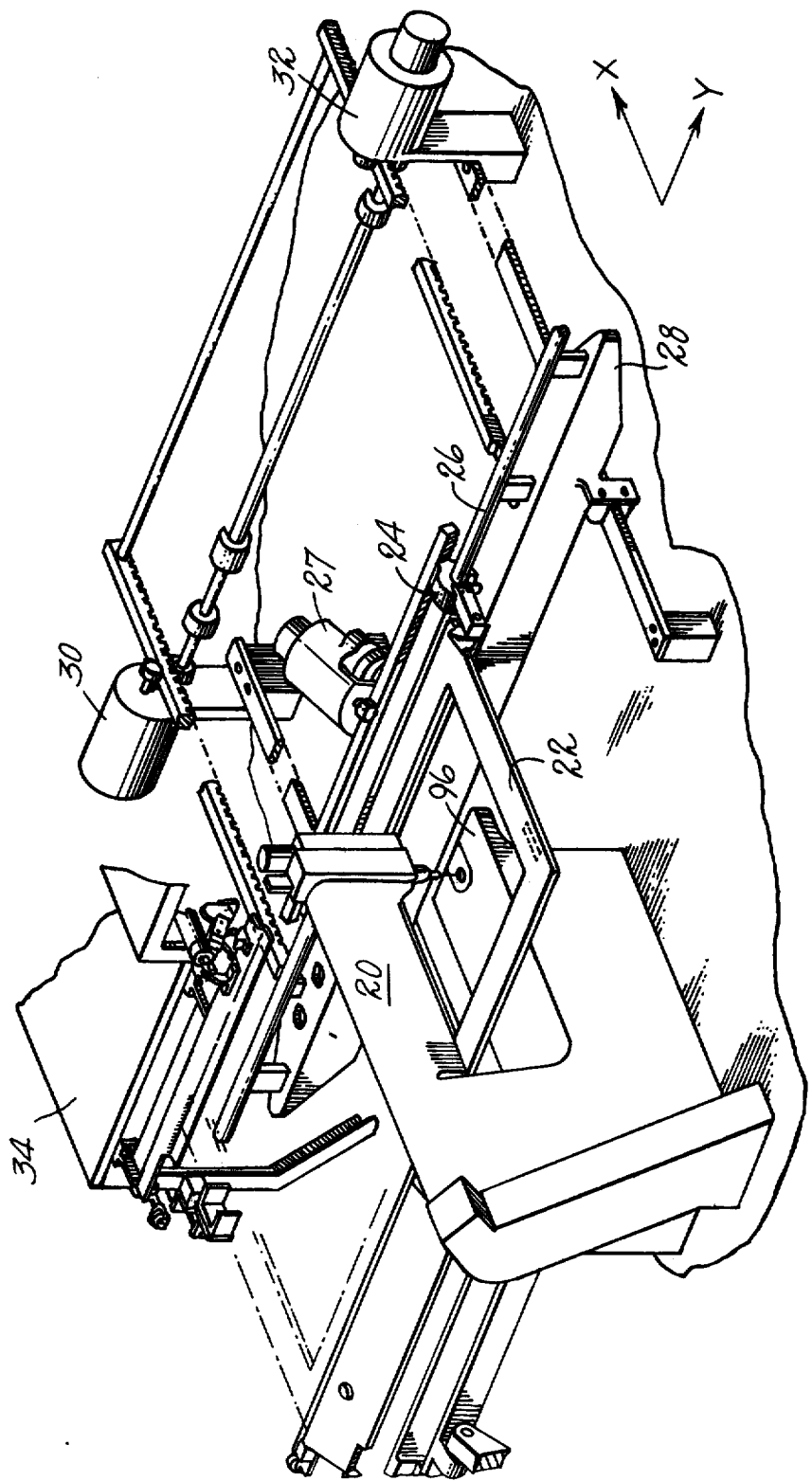
FIG. 1 is an overall perspective view of an automatic sewing machine system having an automatic pallet handling apparatus in association with an automatic positioning system.

Referring to FIG. 1, an automatic sewing machine system having X, Y positioning with respect to a sewing machine head 20 is generally shown. A pallet 22 is mounted to a carriage 24 which is driven in a Y direction along a cylindrical axis 26 by a motor 27. The cylindrical axis 26 is mounted on a frame 28 which is moved in an X direction by a pair of motors 30 and 32. The movement of the carriage 24 and the frame 28 is further disclosed in U.S. Pat. No. 4,406,234 entitled, "Positioning Apparatus" filed in the names of Richard M. Elliott and Herbert Johnson. It is to be appreciated that the aforementioned X-Y positioning apparatus has been disclosed as only the preferred embodiment of a positioning system for use in the present invention. Other various combinational drive systems may also be used with the pallet handling apparatus of the present invention.

The pallet 22 is moved into position relative to the carriage 24 by a pallet handling system 34. As will be explained in detail hereinafter, the pallet handling system 34 is operative to simultaneously handle at least three pallets. These pallets will occupy respectively an input position, a middle position, and an output position. The pallet 22 is illustrated in FIG. 1 as being in the middle position which allows for automatic sewing.

Figure 2:
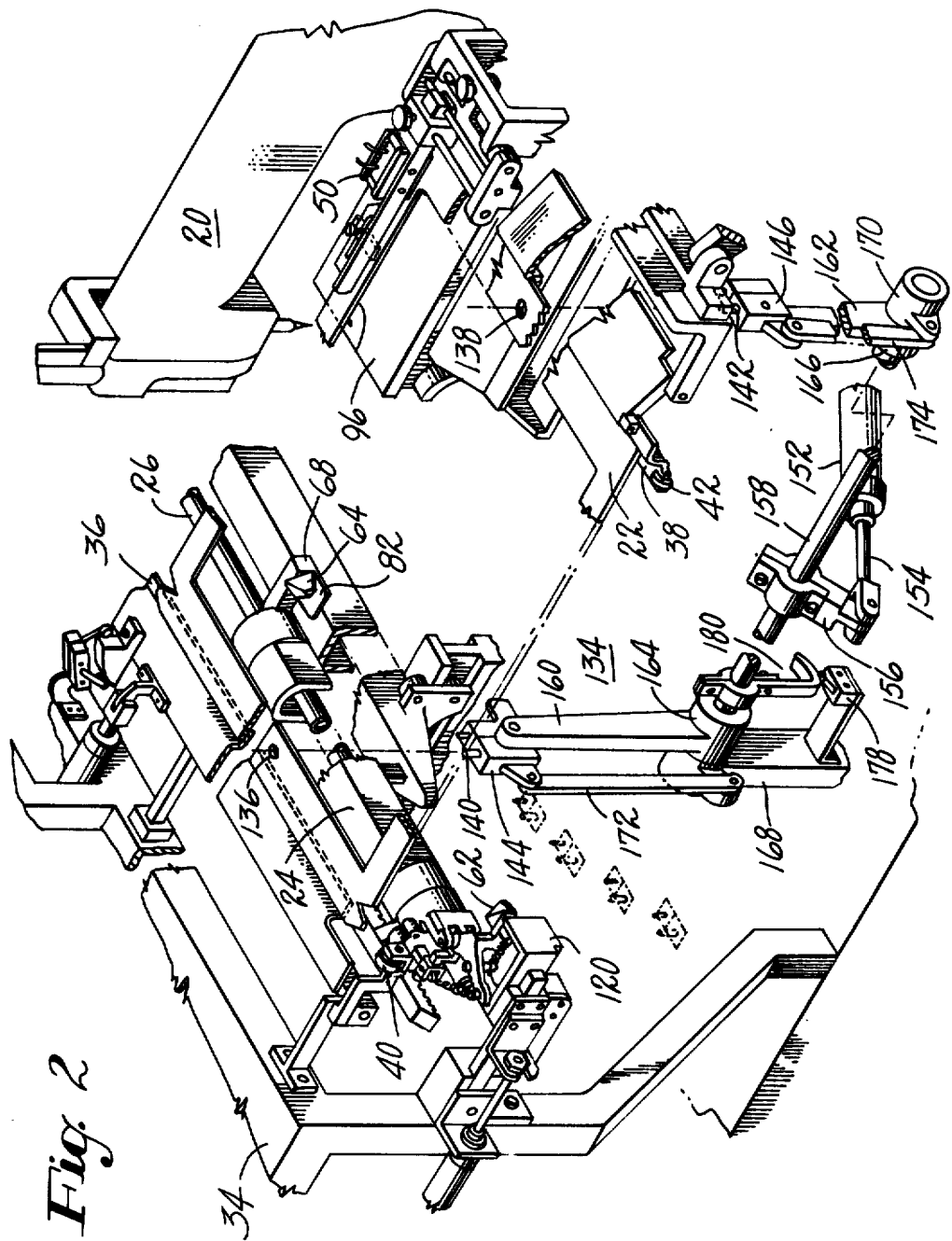
FIG. 2 is a perspective view of the pallet handling apparatus in association with the sewing machine head of the automatic sewing system.

Referring now to FIG. 2, the pallet 22 is illustrated in the input position within the pallet handling apparatus 34. In particular, the pallet 22 is seen to rest on a left shelf 36 and a right shelf 38 of the pallet handling system 34. The pallet has been previously loaded onto the left and right shelves via a pair of rollers 40 and 42.

Figure 3:
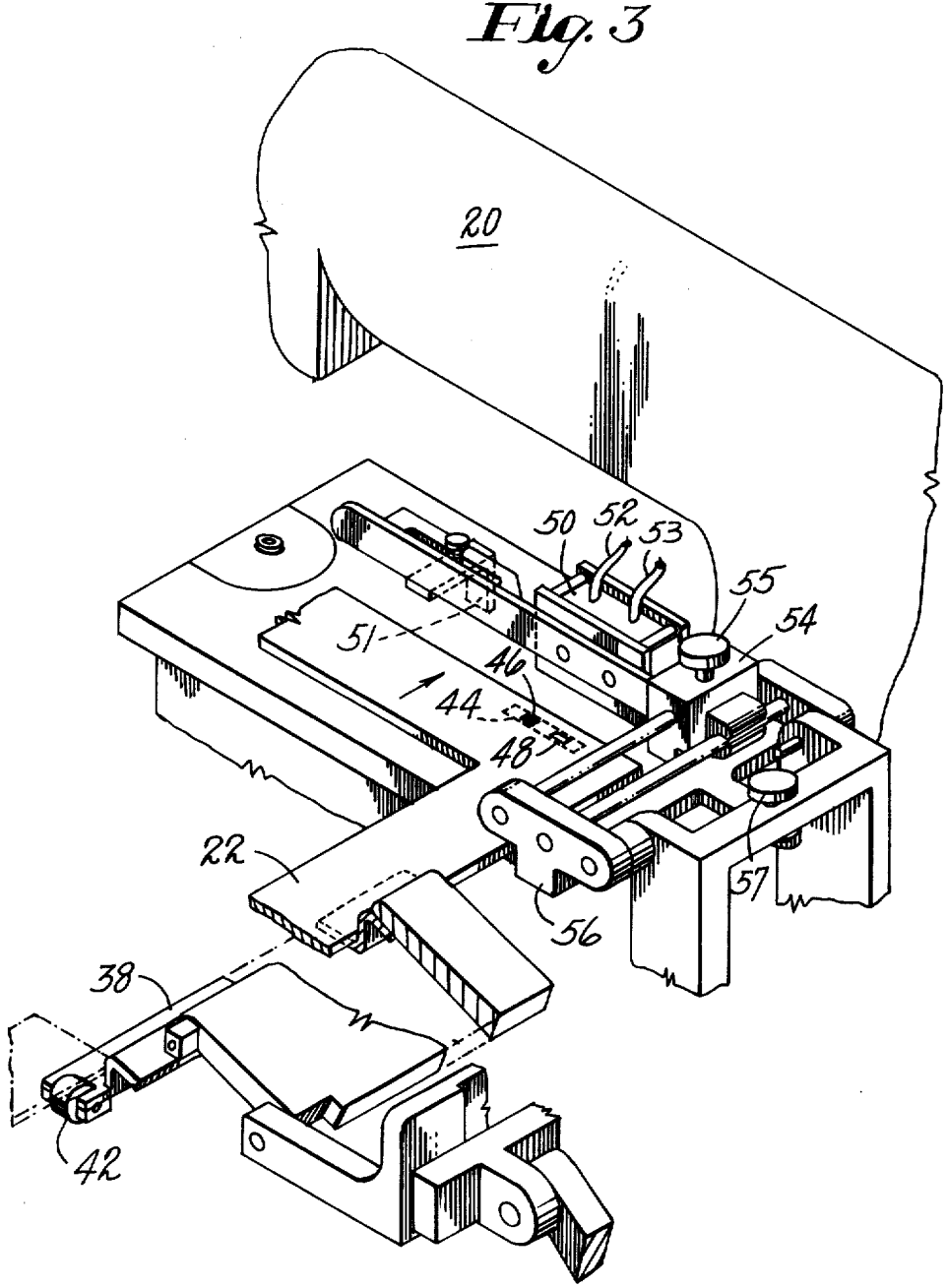
FIG. 3 illustrates the pallet sensor associated with the automatic pallet handling apparatus.

Referring to FIG. 3, a corner of the pallet 22 is shown in the process of being loaded onto the right shelf 38. It is to be noted that the pallet 22 is still being rolled into place over the roller 42. The corner of the pallet 22 is seen to have a pallet identification code 44 impressed thereon. The pallet identification code 44 consists of two separately coded surface areas 46 and 48. The coded surface area 46 is opaque and non-reflective whereas the coded surface area 48 is reflective. It is to be appreciated that various combinations of reflective and non-reflective coded surfaces may occur within the pallet identification code 44. In this regard, the following combinations of coded surfaces may be present in accordance with the present invention.

| Coded Surface 46 | Coded Surface 48 |
| --- | --- |
| Opaque | Reflective |
| Reflective | Opaque |
| Reflective | Reflective |

The pallet identification code 44 is presented to a pallet identification sensor device 50 when the pallet 22 is moved back against a limit stop 51. When this occurs, the pallet identification sensor device 50 optically senses the coded surfaces 46 and 48. This is done by a pair of separate optical sensors within the pallet identification sensor device 50. Each optical sensor measures the reflection of light from the coded surface presented thereunder. In accordance with the preferred embodiment of the invention, the optical sensor reading the opaque encoded surface of FIG. 3 will produce a logically low signal condition on a line 52. On the other hand, the optical sensor device which senses the reflective coded surface 48 will produce a logically high signal on a line 53. The coded significance of the logic level signals produced as a result of reading the pallet identification code 44 will be further discussed hereinafter. For the present, it is merely to be noted that the condition where both optical sensors do not sense a reflection is reserved for a condition where no pallet is present under the pallet identification sensor device 50.

Figure 9:
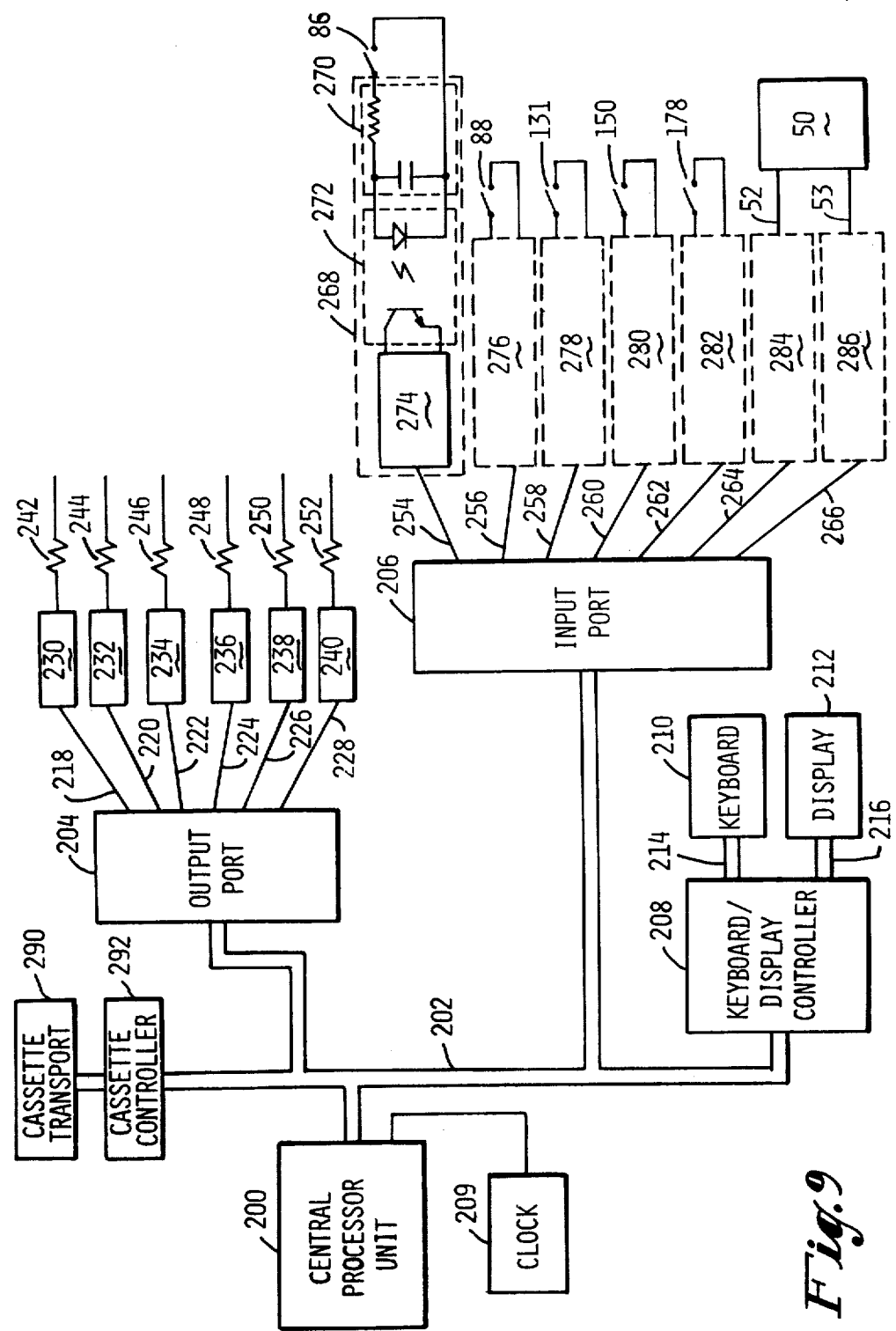
FIG. 9 illustrates the automatic control system associated with the pallet handling apparatus of FIGS. 2-9.

The lines 52 and 53 are connected to an automatic control system which is illustrated in FIG. 9. The details of this control system will be discussed hereinafter in conjunction with FIG. 9. For the present, it is merely to be noted that the control system senses the presence of the pallet in response to the signal conditions on the lines 52 and 53. The control system thereafter sequentially operates the elements comprising the pallet handling system 34 so as to move the sensed pallet through various defined pallet positions. This sequential operation of the elements is premised on the conditions of various switches present within the pallet handling system. These switches interface with the automatic control in much the same manner as the sensor 50. The mechanical operation of the pallet handling system will now be discussed before turning to the detailed description of the automatic control in FIG. 10.

The pallet identification sensor device 50 and the limit stop 51 are adjustably positioned within the pallet handling system 34 by a slidable mount 54 which can be fixed in any position via a set screw 55. In this manner, the position of the pallet identification sensor device 50 can be adjusted so as to accommodate different sized pallets. The mounting structure for the pallet identification sensor device 50 furthermore includes a pivotal mount 56 which allows the pallet identification sensor to be pivoted out of the way during sewing head maintenance.

Figure 4:
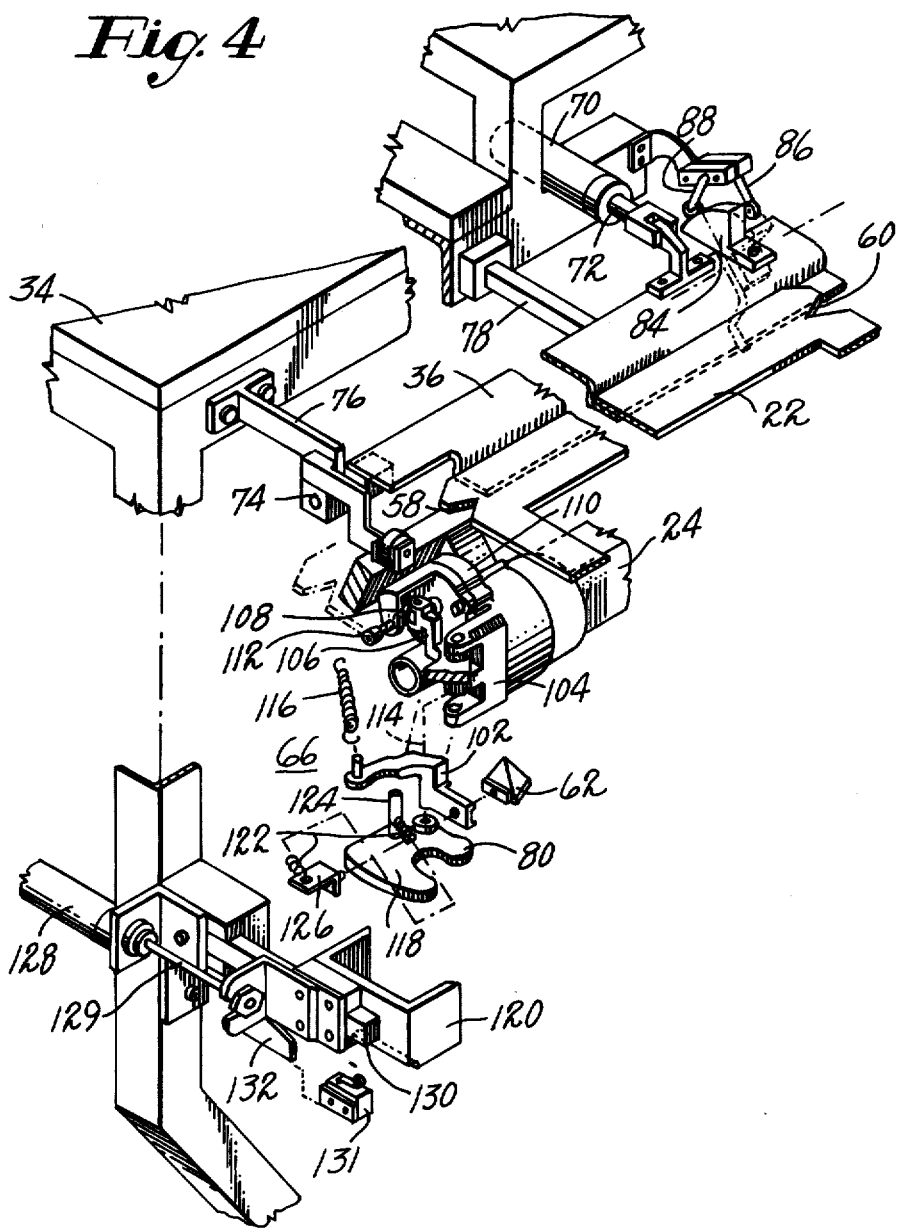
FIG. 4 is a perspective view of a portion of the automatic pallet handling apparatus.
Figure 6:
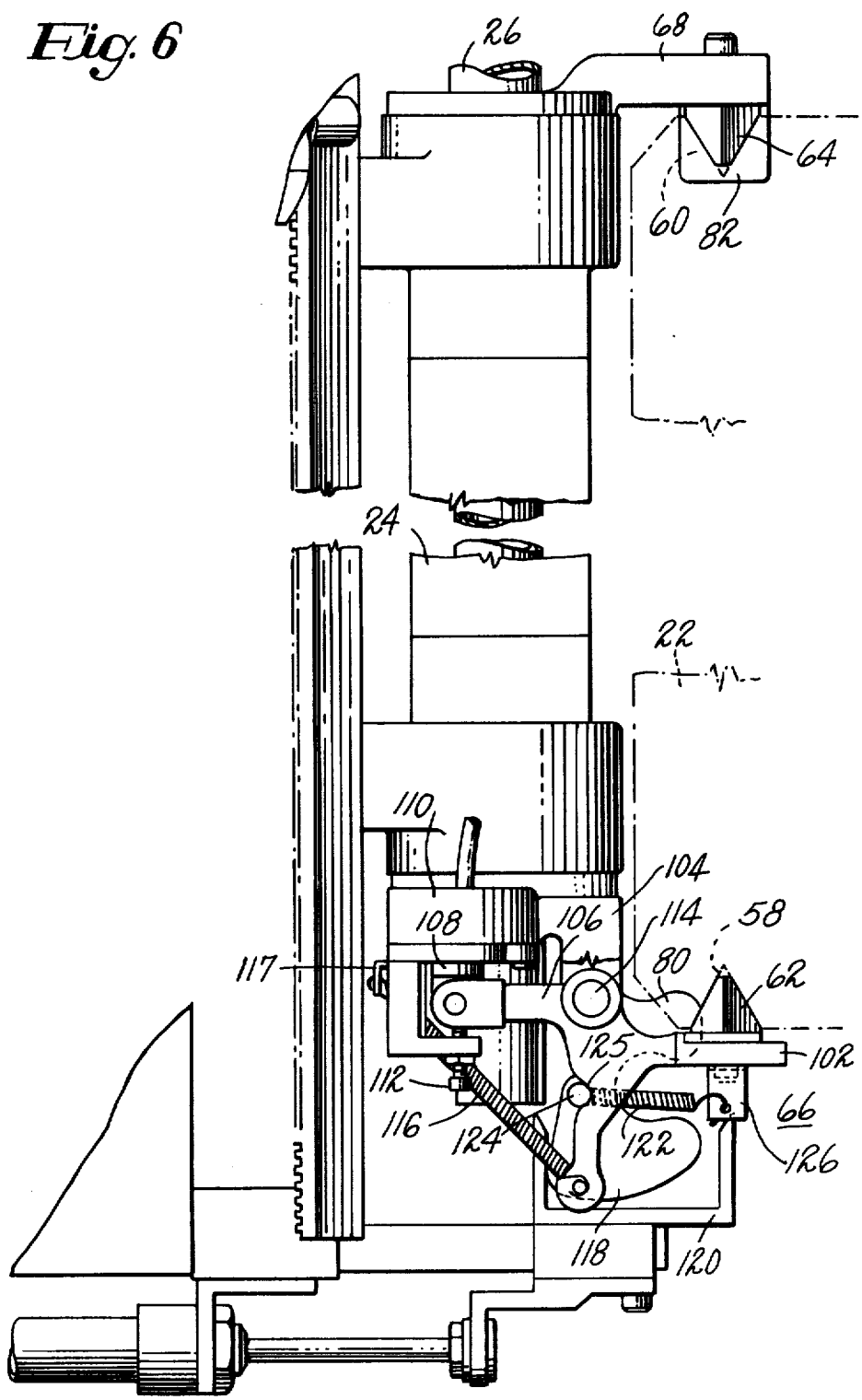
FIG. 6 illustrates the locking of the transferred pallet to a carriage within the automatic positioning system.

Having now described the loading and sensing of the pallet 22 at the top input position, it is now appropriate to turn to the various functioning mechanisms which permit the pallet 22 to assume the middle position within the pallet handling system. Referring to FIG. 4, the left portion of the pallet handling system 34 is illustrated in detail. The left portion of the pallet 22 is illustrated in place on the left shelf 36. This position of the pallet 22 is directly above the carriage 24 to which it is to be ultimately attached. In this regard, the pallet 22 is seen to have two V-notched grooves 58 and 60 located along opposing sides near each corner of the pallet. The V-notches 58 and 60 will ultimately be engaged by a pair of wedges 62 and 64 appearing at either end of the carriage 24 as is shown in FIG. 6. The wedge 62 will be driven into engagement with the V-notch 58 by a pallet clamping mechanism 66 which is attached to the one end of the carriage 24. The wedge 64 is affixed to the other end of the carriage 24 by an arm 68. The wedge 64 acts as a fixed registration for the V-notch 60 during the clamping action of the pallet clamping mechanism 66. The various elements comprising the pallet clamping mechanism 66 will be fully discussed hereinafter.

The manner in which the left edge of the pallet 22 drops downward to the carriage 24 will now be described. As has been previously noted, the left edge of the pallet with the V-notches 58 and 60 to either side rests on the left shelf 36 as shown in FIG. 4. An air cylinder 70 having an output shaft 72 is pivotally attached to the left shelf 36. Upon actuation of the air cylinder 70, the output shaft 72 extends outwardly so as to thereby rotate the left shelf 36 downwardly. The left shelf 36 rotates about a pivotal attachment 74 associated with a frame member 76 and a pivotal attachment (not shown) associated with a frame member 78. When the left shelf 36 has thus been rotated downwardly, the left edge of the pallet 22 drops past it onto a pallet support 80 associated with the wedge 62 and a pallet support 82 associated with the wedge 64. The pallet support 82 is not shown in FIG. 4 but can be seen in FIG. 2. The pallet support 82 is seen to be a tab located underneath the wedge 64. The tab has a sufficient support area projecting outwardly around the perimeter of the wedge 64. This outward tab portion supports a pallet in the vicinity of the V-notch 60 as is illustrated in FIG. 6. The pallet support 80 is also seen to have a tab portion supporting the pallet in the vicinity of the V-notch 58 in FIG. 6. Referring again to the left shelf 36 in FIG. 4, it is seen that a cam member 84 is attached thereto. The cam member 84 is in contact with a limit switch 86 when the left shelf has moved downwardly so as to allow the pallet 22 to drop onto the pallet support members 80 and 82. The cam member is depicted in FIG. 2 as being in contact with a limit switch 88 when the left shelf is in an upward position. As will be explained in detail hereinafter, the automatic control utilizes the switches 86 and 88 during the movement of the left shelf 36.

Figure 5:
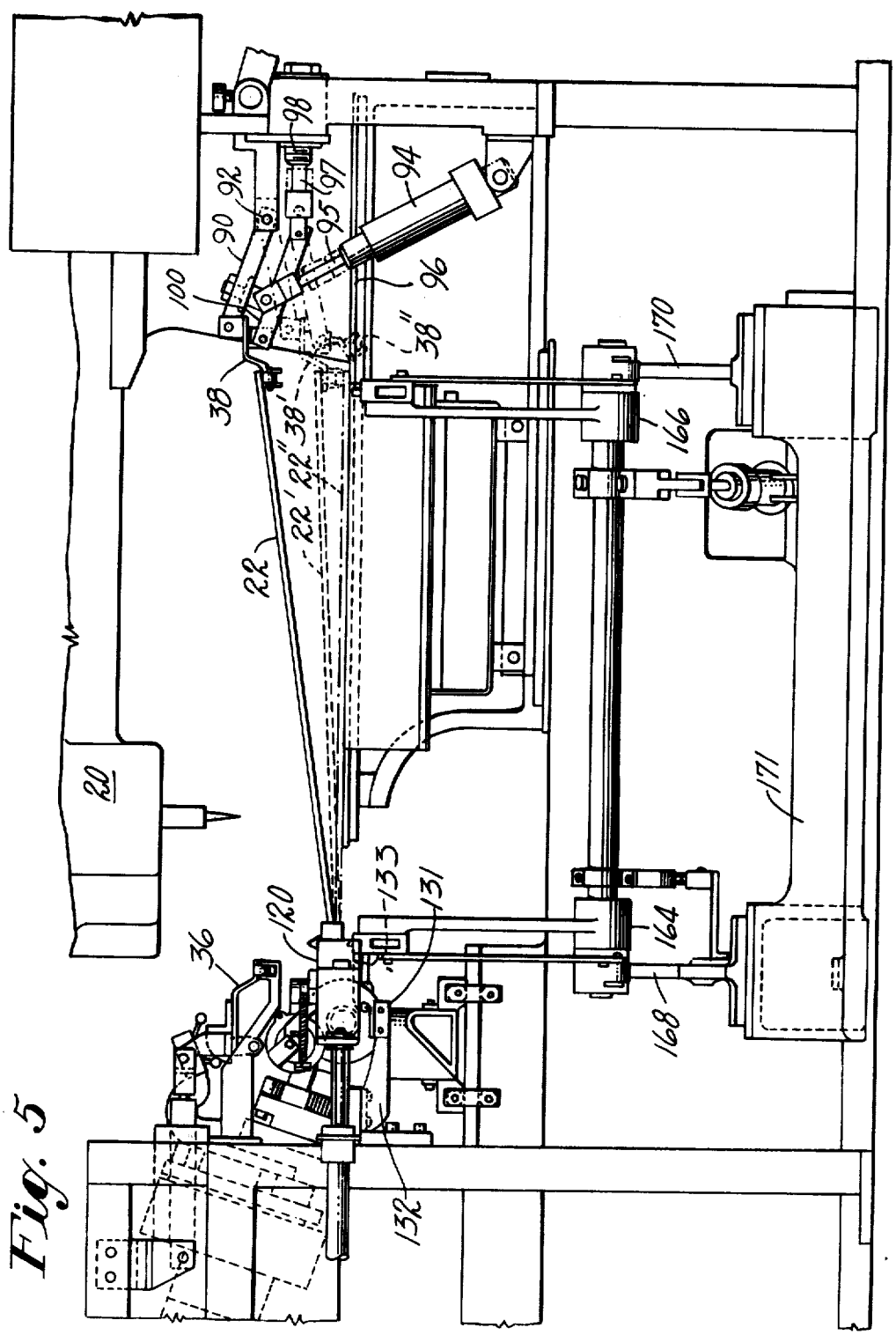
FIG. 5 illustrates the transfer of a pallet within the automatic pallet handling apparatus.

The automatic control is operative to now cause the right side of the pallet 22 to be lowered. Referring to FIG. 5, the right side of the pallet 22 is seen to rest on the right shelf 38 at an elevated position. The right shelf 38 is pivotally connected to an upper bar 90 of a four bar linkage. The upper bar 90 is rotated downwardly about a pivotal point 92 by an air cylinder 94. The retraction of the output shaft 95 of the air cylinder 94 causes the right shelf 38 to assume the position denoted in dotted outline by 38'. The position of the pallet 22 when thus held by the right shelf in the position labelled 38' is illustrated by the dotted outline form labelled 22'. It is to be appreciated that the pallet 22' still rests within the right shelf 38' in this downward position which is only a short distance from the bed 96 of the sewing machine head 20. The pallet 22 is next caused to drop onto the bed 96 by the retraction of an output shaft 97 associated with the air cylinder 98. In this regard, the output shaft 97 associated with the air cylinder 98 is pivotally connected to a lower bar 100 of the double bar linkage. The position of the right shelf 38 following the retraction of the output shaft 97 associated with the air cylinder 98 is illustrated by the dotted outline denoted as 38". This latter position of the right shelf 38 is such as to completely clear the pallet 22" which now rests on the reference base 96. The pallet 22" has now reached the middle position within the pallet handling system. The right shelf 38 can now be rotated upwardly relative to the pivotal point 92 without interferring with the pallet 22". As will become apparent hereinafter, this latter rotation of the right shelf 38 occurs after the pallet has been clamped by the pallet clamping mechanisms 66 and 68. In any event, the right shelf 38 is reset by first actuating the air cylinder 94 so as to extend the output shaft 95 associated therewith so as to cause the upper bar 90 to rotate about the pivotal point 92. The air cylinder 98 is thereafter actuated so as to extend the output shaft 97 associated therewith so as to thereby cause the lower bar 100 to further position the right shelf upwardly into its reset position.

Once the pallet has assumed the middle position denoted by 22", it can be clamped by the pallet clamping mechanism 66. Referring to FIG. 4, the elements of the pallet clamping mechanism 66 are illustrated in exploded relationship to one another. The wedge 62 is attached to a pivotal lever 102 which rotates within a fixture 104 forming part of the casting for the carriage 24. Only a portion of the pivotal lever 102 is illustrated within the fixture 104. This portion is seen to include an arm 106 pivotally connected to an output shaft 108 of an air cylinder 110. The output shaft 108 and the air cylinder 110 are clearly shown in FIG. 6. The output shaft 108 is operative to extend outwardly into contact with an adjustable limit stop 112. The outward extension of the shaft 108 causes the pivot lever 102 to rotate about the axis 114 defined by the fixture 104. The rotation of the pivot lever 102 about this axis causes the wedge 62 to move into the notch 58 of the pallet 22 as is shown in FIG. 6. It is to be appreciated that the aforementioned motion of the pivotal lever 102 is against the spring biasing force of a spring 116 connecting the pivotal lever 102 to an eyelet anchor 117 shown in FIG. 6.

It is hence to be appreciated that actuation of the air cylinder 110 causes its output shaft 108 to extend thereby rotating the pivotal lever 102 about the axis 114. This forces the wedge 62 strongly against the notch 58 which in turn urges the notch 60 strongly against the wedge 64. The thus clamped pallet 22 is clearly shown in FIG. 6.

It is to be noted that a heel 118 of the pallet support member 80 is positioned within a cradle 120 in FIG. 6. The cradle 120 is operative to maintain the pallet support member 80 in position below the pallet 22 during the aforementioned clamping or latching operation. The pallet support member 80 is also maintained in place by virtue of a spring 122 attached between a post 124 extending upwardly from the pallet support member 80 and a tab 126 connected to the pivotal lever 102. In this regard, the tensioned spring 122 produces a biasing force on the post 124 which tends to cause the post 124 to engage a rearward curved portion 125 of the pivotal lever 102. This biasing of the post 124 against the curved portion 125 maintains a toe portion of the pallet support member 80 underneath the pallet 22. This position of the pallet support member 80 is maintained during the pattern controlled movement of the pallet 22 with respect to the sewing machine 20. It is to be noted that before the aforementioned movement can take place, it is first of all necessary to move the carriage 24 along the axis 26 so as to remove the pallet support member 80 from within the cradle 120. This is essentially a command of movement in the Y-direction before any movement in the X-direction.

When the pattern stitching has been completed, the X-Y positioning system of FIG. 1 moves the pallet 22 again back to the position illustrated in FIG. 6. At this time, the air cylinder 110 is exhausted. The spring 116 exerts a biasing force on the pivotal lever 102 so as to rotate the pivotal lever about the axis 114. This also causes the shaft 108 to thereby retract within the exhausted air cylinder 110. The result is that the wedge 62 at the end of the pivotal lever 102 disengages from the V-notch 58 within the pallet 22.

Figure 7:
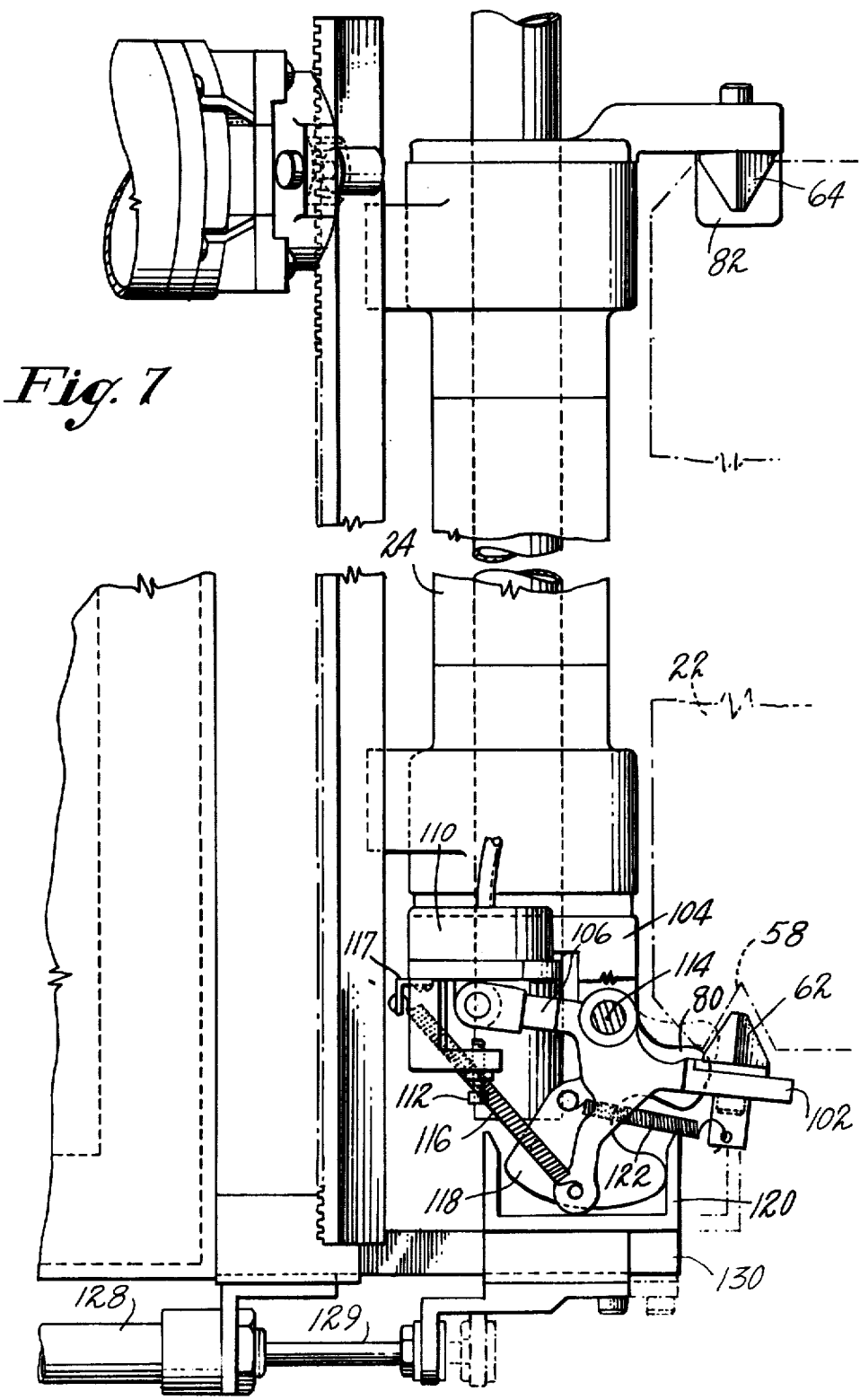
FIG. 7 illustrates the unlocking of the pallet from the carriage of the automatic positioning system.

Referring to FIG. 7, the wedge 62 is illustrated as being withdrawn from the notch 58. FIG. 7 furthermore discloses the actuation of an air cylinder 128 associated with the cradle 120. In this regard, the output shaft 129 of the air cylinder 128 is seen to have moved from a first dotted outline position to a second retracted position. The cradle 120 slides along a guide 130 extending outwardly from the frame of the pallet handling system 34 as is shown in FIG. 4. This movement of the cradle 120 along the guide 130 trips a switch 131. The switch 131 is attached to a downwardly extending member 132 which is connected to the frame of the pallet handling apparatus 34. Referring to FIG. 5, the switch 131 is seen to normally be closed when the output shaft 129 is extended so as to maintain the pallet support 80 in position underneath the pallet. The switch 131 opens when it engages a slot 133 within the slidable attachment to the cradle 120. This later event occurs during retraction of the output shaft 129 which moves the cradle 120 and hence the slot 133 relative to the stationary switch 131 allowing it to open.

The movement of the cradle 120 causes the pallet support member 80 which is registered therein to be rotated backwardly about the axis 114 as is illustrated in FIG. 7. This causes the toe portion of the pallet support member 80 to clear the underside of the pallet 22 as is shown in FIG. 7. The front edge of the pallet 22 now drops downwardly as a result of the removal of the toe portion of the pallet support member 80. The pallet drops down onto a pallet ejector system 134 as shown in FIG. 2. In this regard, a pair of holes 136 and 138 within the pallet 22 are engaged by a pair of aligned pins 140 and 142. The pins 140 and 142 are located on blocks 144 and 146 whose top surfaces stop and support the pallet 22 around the respective holes 136 and 138.

Figure 8:
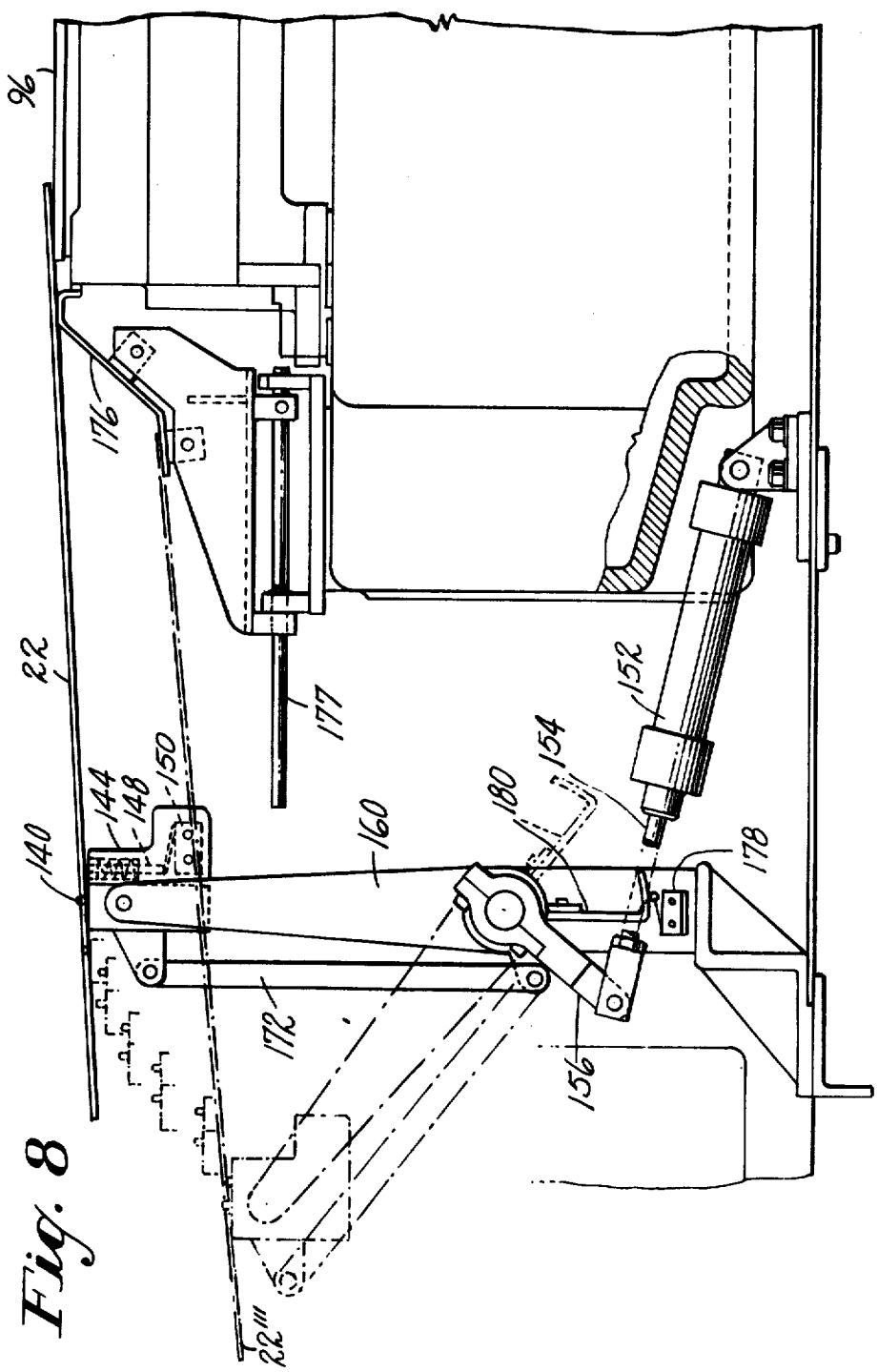
FIG. 8 illustrates the pallet ejector mechanism present within the automatic pallet handling apparatus.

Referring to FIG. 8, the pallet 22 is illustrated as resting on the block 144 with the pin 140 penetrating the hole 136. The block 144 is seen to house a vertical plunger 148 which cooperates with a switch 150 so as to sense the presence of the pallet 22. In other words, when the hole 136 successfully locates over the pin 140, the plunger 148 depresses and closes the switch 150. The switch 150 triggers the automatic control which in turn starts the ejection of the pallet 22. This is accomplished by actuating an air cylinder 152 so as to retract an output shaft 154. The output shaft 154 is pivotally attached to a drive link 156 which is affixed to a shaft 158 of the ejector mechanism. The retraction of the output shaft 154 causes a counter clockwise rotation of the shaft 158. Referring to FIG. 2, the blocks 144 and 146 are seen to be held by a pair of vertical struts 160 and 162 having bases 164 and 166 physically attached to the shaft 158. The shaft 158 in turn is rotatable within a pair of journalled supports 168 and 170 which are affixed to a base 171 illustrated in FIG. 5. The blocks 144 and 146 are pivotally attached to the struts 160 and 162 so as to maintain a proper engagement with the pallet 22 during ejection. The degree of movement of the blocks 144 and 146 with respect to the struts 160 and 162 is limited by a pair of pivotally attached coupling links 172 and 174. In this regard, the coupling links 172 and 174 are each respectively pivotally attached to both the blocks 144 and 146 as well as the journalled supports 168 and 170.

Referring to FIG. 8, the movement of the ejector mechanism 134 during retraction of the output shaft 154 of the air cylinder 152 is illustrated. As has been previously discussed, this causes a rotation of the shaft 158 which in turn moves the struts 160 and 162 outwardly. The ejection path of the block 144 suspended attop the strut 160 and the link 172 is shown in dotted outline form in FIG. 8. The pallet is seen to slide down an adjustable sloped guide surface 176. The sloped guide surface 176 is adjustable along a rail 177 so as to accommodate various sized pallets. When the ejector mechanism 134 has moved the pallet 22 halfway outward, a switch 178 is released by a contact 180 affixed to the shaft 158 as shown in FIG. 2. The contact 180 is configured so as to open the switch 178 when the ejector mechanism 134 is halfway outward. In this regard, the contact 180 actually loses contact with the switch 178 at the halfway point. The contact 180 ultimately assumes a spaced position from the switch 178 as is indicated in dotted outline form. The opening of the switch 178 is a signal to the automatic control that ejection is actually taking place. The pallet is brought outward to a position 22''' that allows the attendant or operator to easily grasp and remove the pallet. This can actually be done during or after the loading of the next pallet into the middle position wherein it is clamped or locked into the carriage 24. In this manner, the sewing machine 20 does not lose valuable time due to the attendant having to immediately handle the completed pallet 22.

Referring to FIG. 9, an automatic digital control system for the pallet handling system 34 is illustrated. The digital control system is seen to include a programmed central processor unit 200 which is connected via an address and data bus 202 to an output port 204, an input port 206, and a keyboard/display controller 208. The central processor receives a clocking signal for internal timing purposes from a clock 209. The central processor unit 200 is preferably an Intel 8085 microprocessor which is an eight bit microprocessor available from the Intel Corporation. The address and data bus 202 is preferably a multibus available from Intel Corporation with the Intel 8085 microprocessor. The output port 204 is preferably an interfacing circuit identifiable as an Intel 8212 circuit which is compatible with the address and data bus 202. In a like manner, the input port 206 is an Intel circuit identifiable as an 8255-A and the keyboard/display controller 208 is an Intel circuit 8279.

The keyboard/display controller 208 interfaces with a keyboard 210 and a display 212. The keyboard can be any of a variety of commercially available keyboards interfacing with the controller 208 via a control bus 214. In this regard, the keyboard/display controller 208 merely scans the eight bits of information available over the control bus 214 and stores the same for subsequent communication with the central processor unit 200 via the address and data bus 202. It is to be noted that the keyboard/display controller 208 will be receiving eight bits of ASCII coded information from the keyboard 210 via the control bus 214. The ASCII code is a standard eight bit binary code for various keys present on commercially available keyboards. It is to be furthermore noted that the keyboard/display controller 208 will transmit keyboard information to the central processor unit 200 in ASCII code. The central processor 200 will convert the thus received information for its internal processing. Any transmittal of information back to the keyboard/display controller 208 will be previously coded In ASCII by the central processor 200. The keyboard/display controller 208 receives the ASCII coded character information from the central processor 200 via the address and data bus 202 and provides character generation information to the display 212 via a display bus 216 in a well-understood manner. It is to be understood that the display 212 can be any of a number of commercially available displays capable of responding to character generation information from the keyboard/display controller 208.

The output port 204 is seen to have six separate bilevel signal outputs identifiable as 218 through 228. The signals from the bilevel signal outputs 218 through 228 are applied to solid state relays 230, 232, 234, 236, 238 and 240. Each relay respectively converts a logically high bilevel signal applied thereto to a 24 volt AC signal that can be applied to respective solenoid associated therewith. It is to be understood that each solenoid governs the action of a pneumatic valve associated with one of the pneumatic air cylinders present in the pallet handling system. A valve can either exhaust or admit air into the respective air cylinder in response to the 24 volt AC signal being impressed on its solenoid. The particular air cylinder and corresponding valve action is a matter of arbitrary choice according to the present invention since the bilevel signal condition present on the respective bilevel outputs 218 through 228 can either be set logically high or logically low to accomplish the appropriate action of the air cylinder. In other words, if it is necessary to issue a logically high signal at a particular bilevel output so as to impress a 24 volt AC signal on the corresponding solenoid in order to obtain an extension of the output shaft of the respective air cylinder, then such a signal would issue when the extension was desired. On the other hand, a commercially available pneumatic air cylinder requiring a lack of solenoid excitation for the extension of the output shaft would experience an appropriate logically low signal condition at the corresponding bilevel output. Accordingly, the signal conditions present at the respective bilevel outputs 218-228 will hereinafter be described in terms of the desired effect, namely, extension or retraction of the output shaft of the respective air cylinder.

Referring again to the specific solenoids in FIG. 9, it is to be noted that a solenoid 242 controls the pneumatic action of the air cylinder 70. It will be remembered that the air cylinder 70 dictates the movement of the left shelf 36. In like manner, the solenoid 244 controls the pneumatic air cylinder 94 associated with the right shelf 38. Solenoid 246 is associated with pneumatic air cylinder 98 which controls the withdrawal of the right shelf 38. Solenoid valve 248 is associated with pneumatic air cylinder 110 which controls the pallet clamping mechanism 66. Solenoid valve 250 is associated with air cylinder 128 which controls the movement of the cradle 120. Finally, a solenoid valve 252 controls the air cylinder 152 associated with the pallet ejector mechanism 134.

The input port 206 receives seven logic level signals at bilevel signal inputs 254, 256, 258, 260, 262, 264, and 266. Each bilevel signal input receives a logic level signal from a respective buffer circuit associated with a switch within the pallet handling mechanism 34. Referring first to the bilevel signal input 254, it is seen that a buffer circuit 268 provides a bilevel signal to this input in response to the closing of the switch 86. It will be remembered that the closed switch 86 indicates a downward position of the left shelf 36. The buffer circuit 268 is seen to comprise a noise filter circuit 270 in combination with an optical isolator circuit 272 and a bounce filter circuit 274. The noise filter 270 merely filters the electrical noise from the switch signal whereas the optical isolator 272 provides a further isolated signal that is applied to the conventional bounce filter circuit 274 which samples the signal from the optical isolator and provides an appropriate output signal only when the sampled signal is consistent for a period of time approximating 20 milliseconds. In this manner, an appropriate bilevel signal is applied to the bilevel signal input 254 of the input port 206.

The signal state of the bilevel signal input 254 is preferably logically low for a closed switch condition. In this regard, the switch 86 is preferably an electronic switch which generates a logically high signal condition when closed. This signal state is inverted by the various circuits comprising the buffer circuit 268. This results in a logically low signal state at the bilevel signal input 254 for the closed switch condition. It is to be noted that this signal conversion will prevail for the other bilevel signal inputs which are connected through respective buffer circuitry to various switches within the pallet handling system. This signal conversion need not however be followed in practicing the invention if the significance of a given state at a given bilevel input is taken into account within the software program resident within the central processor 200.

A buffer circuit 276 having the same internal configuration as that of buffer circuit 274 is connected to the switch 88. It will be remembered that the switch 88 defines an upward level position of the left shelf 36 when closed. The buffer circuit 276 is operative to produce a logically low bilevel signal to the bilevel signal input 256 in response to a closure of the switch 88.

A buffer circuit 278 processes the signal condition of the switch 131 through to the bilevel signal input 258. It will be remembered that the switch 131 closes when the cradle 120 is positioned outwardly so as to reset the pallet support 80 for subsequent support of a received pallet.

A buffer circuit 280 processes the signal condition of the switch 150 through to the bilevel signal input 260. It will be remembered that the switch 150 closes when the pallet has been engaged by the pallet ejector mechanism 134. This closed switch condition results in a logically low bilevel signal input 260.

A buffer circuit 282 processes the signal condition of the switch 178 through to the bilevel signal input 262. It will be remembered that the switch 178 opens when the pallet has been moved halfway to the extreme outward position by the ejector mechanism 134. This results in a logically high bilevel signal input 262.

A pair of buffer circuits 284 and 286 receive bilevel signals present on the lines 52 and 53 from the pallet identification sensor 50. It will be remembered that the pallet identification sensor 50 is operative to produce either logically high or logically low signal conditions on the lines 52 and 53 in response to particular pallet codes 44. These logic level signal conditions are inverted by the respective buffer circuits 284 and 286 and thereafter presented to the bilevel signal inputs 264 and 266. For the present, it is merely to be noted that the signals on the lines 52 and 53 will be logically low when a pallet is not registered with the pallet identification sensor 50. This will result in logically high signal conditions on the bilevel signal inputs 264 and 266.

As has been previously noted, the buffer circuit 276 is comprised of the same three elements as the buffer circuit 268, namely, a noise filter, an optical isolator and a bounce filter. This can also be said of the buffer circuits 278, 280, 282, 284 and 286.

Referring again to the central processor unit 200, it will be remembered that this unit is preferably an Intel 8085 microprocessor. This unit is available with various amounts of randomly addressable memory which is otherwise known as main memory. This main memory normally contains the software programming necessary to operate and respond to the various digital logic present in FIG. 9. The main memory furthermore contains software programming which controls the digital logic necessary to run the motion control system as well as the sewing machine. This latter programming and associated logic do not form part of the present invention. In addition, the main memory includes an allocated portion reserved for the database utilized by the programs. This database includes stitch pattern files defining various stitch patterns that are to be sewn on workpieces mounted within the pallets.

The aforementioned programs and database are normally read into the main memory via one or more tape cassettes. Each tape cassette is inserted into a cassette transport 288 which is driven under the control of a cassette controller 290. The cassette controller 290 transmits the information from the cassette to the main memory of the central processor 200 via the address and data bus 202. The control interfacing whereby information is loaded into the main memory from a tape cassette is well known in the art.

Figure 10:
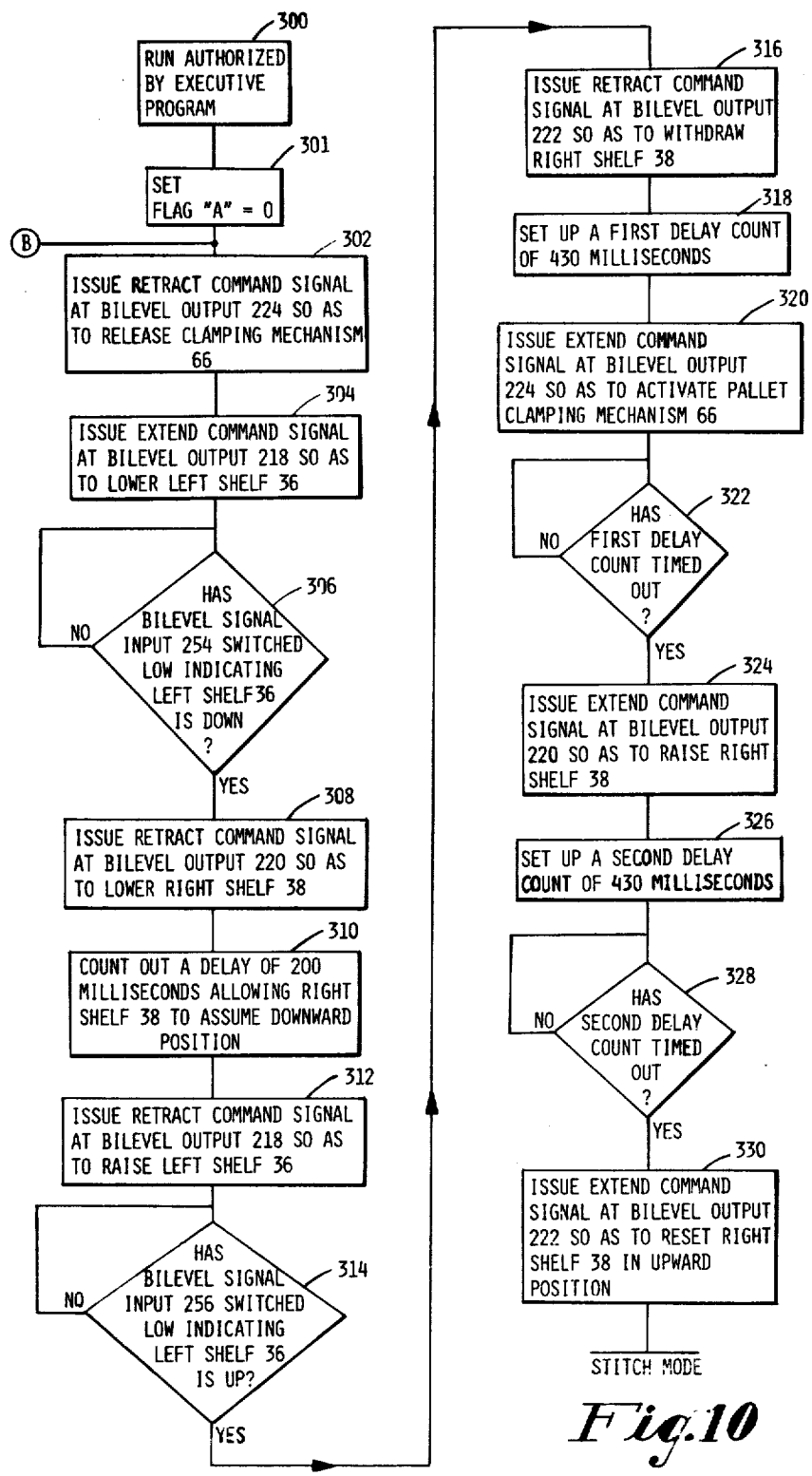
FIG. 10 illustrates the flow of computer commands within the automatic control system of FIG. 9 so as to facilitate the automatic loading of a pallet.

Referring now to FIG. 10, a flow chart of a program resident in the main memory of the central processor 200 is illustrated. This program governs the loading of a pallet into the pallet handling system 34 and will hereinafter be referred to as the PALLET LOAD program. The program begins with a run authorization having been received from an EXECUTIVE program in an initial step 300. The EXECUTIVE program will be described in detail hereinafter. For the present, it is merely to be understood that the EXECUTIVE program will authorize a run when a pallet is in place on the shelves 36 and 38 and a stitch pattern has been prescribed for the loaded pallet.

When the run authorization is received, the central processor 200 proceeds to a step 301 and sets a FLAG A equal to zero. This software flag is utilized by a PALLET UNLOAD program in a manner which will be described hereinafter.

The central processor 200 next issues a RETRACT command signal to the bilevel output 224 of the output port 204 as is indicated by the step 302 in FIG. 10. This is accomplished by specifically addressing the output port 204 and thereafter transmitting an appropriate logic level signal thereto. As has been previously discussed, the signal state of the logic level signal will depend on the configuration of the pneumatic air cylinder that is to be actuated. If the air cylinder is to be exhausted so as to retract the output shaft when the solenoid is deenergized, then the signal at bilevel output 224 will be logically low. On the other hand, if the solenoid must be energized to exhaust the air or if the air must be admitted to retract the output shaft, then the command signal at the bilevel output 224 would be logically high. In any event, the appropriate logic level command signal is generated by the programmed computer and applied to the solid state relay 236. This in turn appropriately energizes or deenergizes the solenoid 248 associated with the air cylinder 110. The net result is that the output shaft 108 of the air cylinder 110 is retracted so as to release the clamping mechanism 66. It is to be noted that the clamping mechanism 66 may already have been released. In this instance, the issuing of the RETRACT command merely is a redundant check on the status of the pallet clamping mechanism 66.

The next step 304 of the central processor 200 is to issue an EXTEND command signal to the bilevel output 218 of the output port 204. This triggers the solid state relay 230 so as to apply a signal condition to the solenoid 242 which allows an outward extension of the shaft 72 associated with the air cylinder 70. Referring to FIG. 4, the outward extension of the shaft 72 results in the left shelf 36 being lowered. The central processor 200 awaits the tripping of the switch 86 which occurs when the left shelf 36 is fully downward. In this regard, the closed switch condition 86 is filtered by the noise filter 270 isolated by the optical isolator 272 and thereafter retained by the bounce filter 274 so as to result in a logically low signal level condition being applied to the bilevel signal input 254. This logically low signal level will be detected by the central processor unit 200 in the step 306 within the flow chart of FIG. 10.

Following a confirmation that the left shelf 36 is down, the central processor 200 issues a RETRACT command signal at the bilevel output 220 of the output port 204 as is indicated by step 308. This RETRACT command triggers the solid state relay 232 so as to apply a signal condition to the solenoid 244 which allows the output shaft 95 of the air cylinder 94 to retract. Referring to FIG. 5, it will be remembered that the retraction of the output shaft 95 of the air cylinder 94 allows the right shelf 38 to be lowered so as to drop the right edge of the pallet from the top input position.

Referring again to the flow chart of FIG. 10, it is noted that the central processor unit counts out a delay of 200 milliseconds in a step 310. This defines an appropriate time for the right shelf 38 to assume the downward position. It is to be noted that the counting out of the delay is accomplished by establishing a count and thereafter decrementing the count by the clock signal from the clock 209.

Following the assumption of a downward position by the right shelf 38, the central processor 200 in a step 312 issues a RETRACT command signal at the bilevel output 218 of the output port 204. This reverses the signal state of the solid state relay 230 so as to apply a signal condition to the solenoid 242 which allows the output shaft 72 associated with the air cylinder 70 to retract and hence raise the left shelf 36. Referring to FIG. 4, the switch 88 is contacted when the left shelf assumes an upward position. The closed signal state of the switch 88 results in a logically low signal state being applied to the bilevel input 256 via the buffer circuit 276. This logically low signal state at the bilevel input 256 is noted by the central processor 200 which addresses the input port 206 and asks whether the bilevel signal input signal 256 has switched low. This is accomplished in a step 314 in FIG. 10.

The central processor 200 next issues a RETRACT command signal in a step 316 to the bilevel output 222 of the output port 204. Referring to FIG. 9, the relay 234, associated with the bilevel output 204, provides a signal condition on the solenoid 246 which results in a retraction of the output shaft of the air cylinder 98. As is seen in FIG. 5, this results in a withdrawal of the right shelf 38. This latter movement of the right shelf 38 allows for an appropriate clearance of the pallet 22 which now rests on the reference base 96. This constitutes the middle position for a pallet within the pallet handling system.

Referring again to FIG. 10, it is seen that the central processor 200 sets up a first delay count of 430 milliseconds in a step 318 following the issuance of the RETRACT command signal at the bilevel output 222. It will be remembered that the clock 209 provides a clock signal to the central processor 200 for the purpose of timing out a delay established by the central processor 200. While the central processor is thus timing out the delay, it also issues an EXTEND command signal in a step 320 to the bilevel output 224 of the output port 204. This triggers the solid state relay 236 so as to apply a signal condition to the solenoid 248 which causes the output shaft 108 of the air cylinder 110 to move outwardly. Referring to FIG. 6, this results in the pivotal lever 102 rotating about the axis 114 so as to apply a clamping pressure to the pallet which has been previously dropped onto the pallet supports 80 and 82. As a result of the clamping action, the pallet is now mated to the carriage 24 and is ready for subsequent positioning under the sewing machine head 20. Before any such positioning can occur, it is first of all necessary for the first delay count to have timed out indicating that the right shelf 38 has in fact reached a withdrawn position. This is provided for the step 322 calling for the delay count to have been timed out in FIG. 10.

Following the timing out of the first delay, the central processor 200 is operative in a step 324 to issue an EXTEND command signal to the bilevel output 220 of the output port 204. This command triggers the solid state relay 232 so as to apply a signal condition to the solenoid 244 which causes the output shaft 95 of the air cylinder 94 to extend upwardly. This in turn causes the right shelf 38 to move upwardly as is shown in FIG. 5. The central processor 200 sets up a second delay count of 430 milliseconds in a step 326 and times out the second delay count so as to allow adequate time for the movement of the output shaft 95 of the air cylinder 94. The timing out is accomplished by a step 328 which utilizes the clocking signal from the clock 209 to time out the count of 430 milliseconds established in the step 326.

The central processor thereafter in a step 330 issues an EXTEND command signal at the bilevel output 222 of the output port 204. This triggers a solid state relay 234 so as to apply a signal condition to the solenoid 246 which causes an outward extension of the output shaft 97 of the air cylinder 98 as is shown in FIG. 5. This constitutes the final step in resetting the right shelf 38 to its upward position. The central processor 200 has now sequenced the left shelf 36 and right shelf 38 through a complete set of movements so as to drop the pallet to the middle position within the pallet handling system 34. The central processor 200 has moreover clamped the thus delivered pallet to the carriage 24 and reset both the left shelf 36 and the right shelf 38. This will allow for the loading of an additional pallet onto the thus reset shelves.

The central processor 200 is operative to call for the movement of the clamped pallet while another pallet is being loaded onto the reset shelves 36 and 38. In accordance with the invention, the movement of the pallet can actually occur as early as the end of step 320. At this point, the withdrawing of the right shelf 38 does not interfere with the movement of the pallet 22. The resetting of the right shelf 38 from a withdrawn and lowered position, as dictated by steps 324 to 330, will also not interfere with the movement of the pallet. The only requirement relative to the initial movement of the pallet is that the carriage 24 first be moved along the axis 26 in the Y-direction toward the sewing machine head 20. This initial movement will disengage the heel 118 of the pallet support from the cradle 120 in FIG. 6.

It is to be appreciated that a motion control program for the aforementioned movement resides in the main memory of the central processor 200. This motion control program utilizes a stored file of stitch pattern information which dictates the synchronized movement of the pallet containing a workpiece underneath a reciprocating sewing needle within the sewing head 20. This is identified broadly as the STITCH MODE in FIG. 10. Following the successful execution of a desired stitch pattern, the pallet containing the finished workpiece is returned to the position illustrated in FIG. 6. This requires a final movement of the carriage 24 along the axis 26 so as to reposition the heel 118 of the pallet support within the cradle 120. This is preparatory to further processing of the clamped pallet by the pallet handling system.

Figure 11:
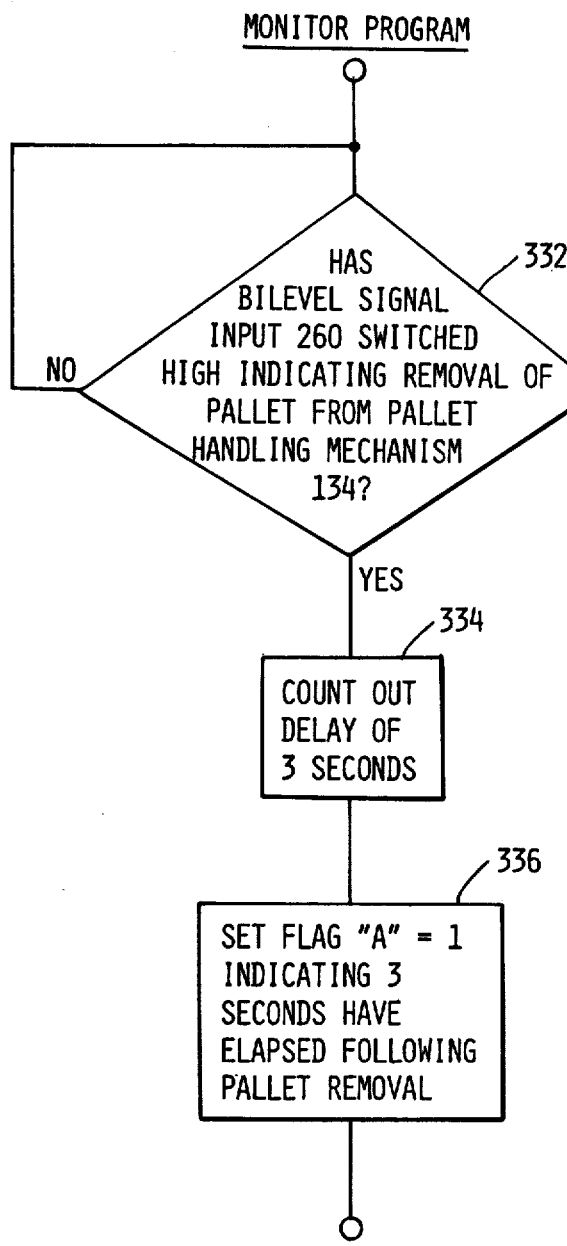
FIG. 11 illustrates the flow of computer commands within the automatic control system of FIG. 9 so as to monitor the removal of an ejected pallet.

Referring now to FIG. 11, a MONITOR program is illustrated in flow chart form. This MONITOR program resides in the central processor unit 200 and is moreover active during the aforementioned stitching mode. In this regard, the MONITOR program is periodically executed for the purpose of ascertaining the status of any pallet that is to be removed by the operator or machine attendant. It will be remembered that the pallet handling system 34 has the capability of moving a finished pallet to an outward position for removal by the operator. The control for this particular processing of the pallet will be explained in detail hereinafter. For the moment, it is merely necessary to note that a pallet may in fact be present on the pallet handling mechanism 134. In this regard, the MONITOR program of FIG. 11 begins with a step 332 wherein the central processor 200 addresses the input port 206 and asks whether or not the bilevel signal input 260 has been switched high. Referring to FIG. 8, it will be remembered that a pallet resting on the block 144 of the pallet handling mechanism 134 will cause a plunger 148 to close a switch 150. This closure of the switch 150 will be processed by the buffer circuit 280 so as to produce a logically low signal condition at the bilevel input 260. As long as this logically low signal condition exists, the central processor 200 merely addresses the bilevel signal input 260 and does nothing further. On the other hand, when the bilevel signal input 260 switches logically high, the central processor 200 counts out a delay of three seconds as is indicated in a step 334 in FIG. 10. This is accomplished by setting up a count of three seconds and allowing the clock 209 to decrement the count to zero. At this time, the central processor sets a FLAG A equal to binary one in a step 336. This provides an indication that three seconds have elapsed following removal of the pallet by the operator. As will become apparent hereinafter, this three second delay is used to trigger the resetting of the pallet ejector mechanism 134. The lapse of three seconds allows the operator sufficient time to remove the pallet before the pallet ejector mechanism 134 begins this reset motion.

Figure 12A:
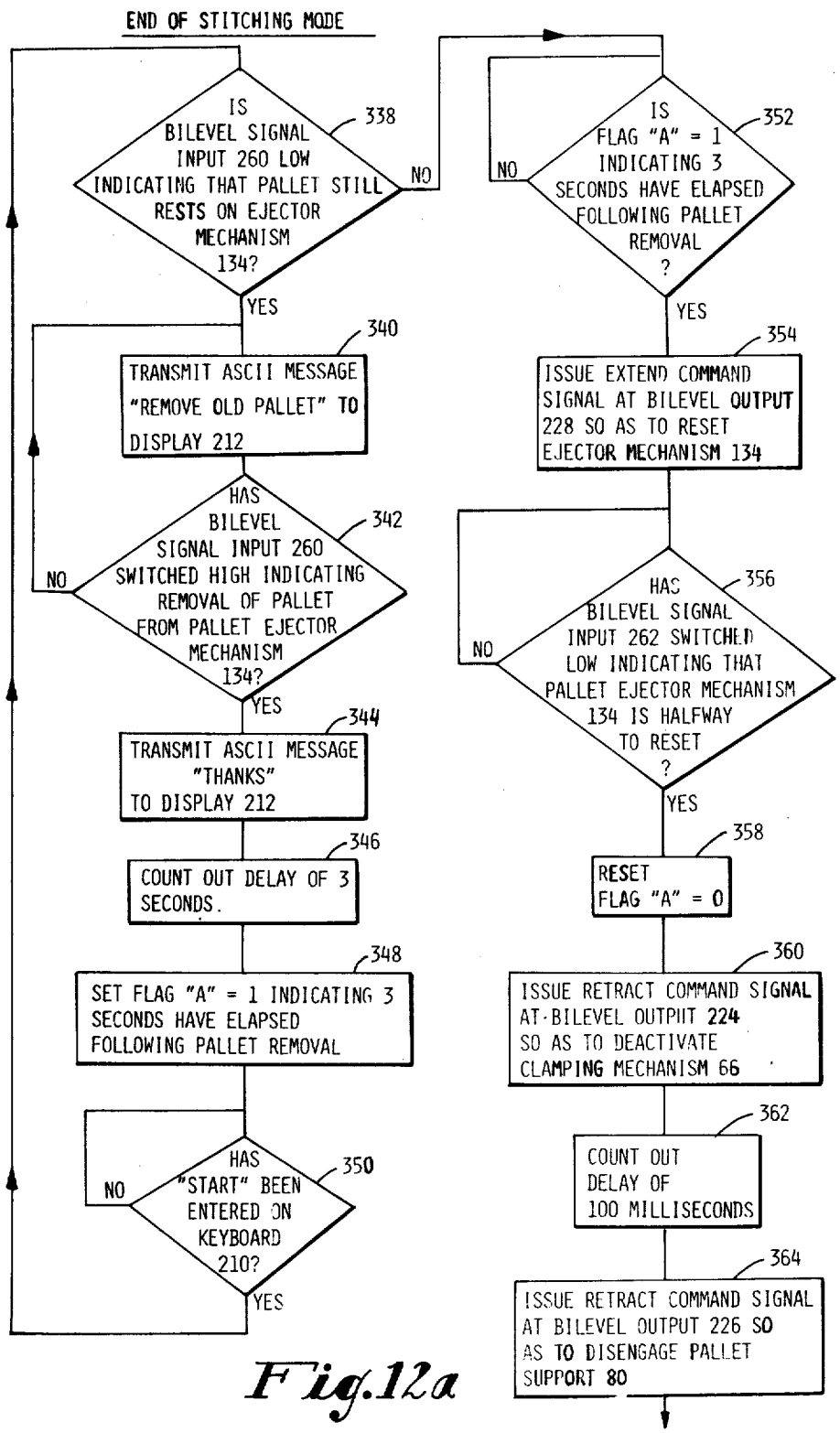
FIGS. 12a and 12b illustrate the flow of computer commands within the automatic control system of FIG. 9 so as to facilitate the unloading of a pallet.
Figure 12B:
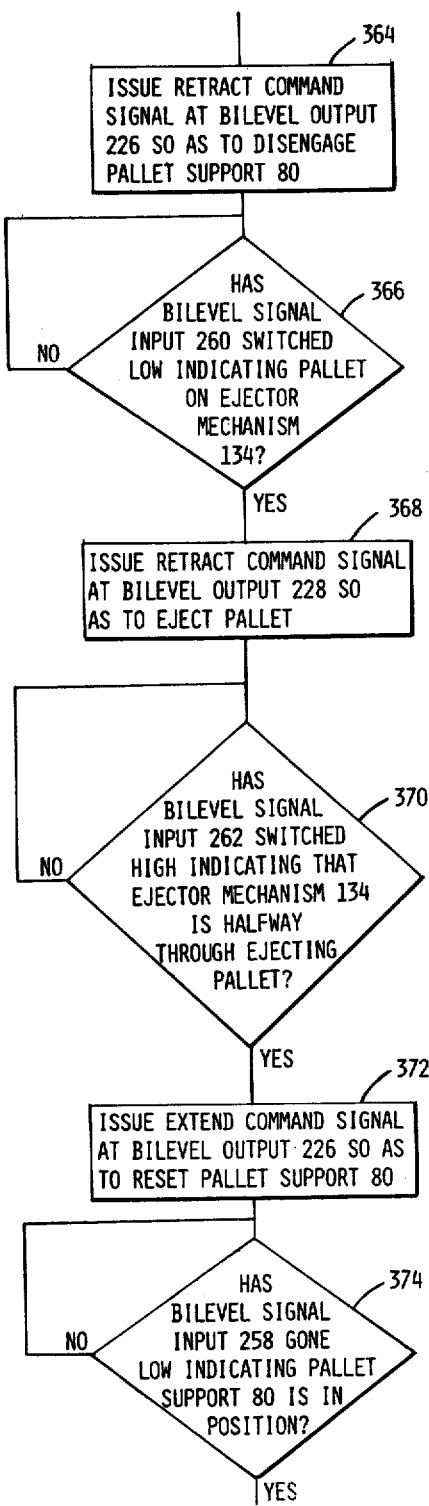

Referring now to FIGS. 12a and 12b, a flow chart depicts a PALLET UNLOAD program which dictates the sequential operation of the central processor 200 during a pallet unloading sequence. In this regard, a previously loaded pallet has been presented to the sewing machine head 20 for sewing and is now ready for the pallet unloading sequence. This is indicated by an end of stitching mode notation in FIG. 12a. It is to be understood that the end of stitching mode juncture depicted in FIG. 12a would include the repositioning of the heel 118 of the pallet support within the cradle 120 as is shown in FIG. 6.

The first inquiry made by the central processor 200 is to ask whether the bilevel signal input 260 is logically low in a step 338. It will be remembered from the previous discussion of FIG. 11, that the bilevel signal input 260 is logically low when the switch 150 associated with the pallet handling mechanism 134 is closed indicating that a pallet still rests on the ejector mechanism 134. If the pallet has not been removed by the operator during the course of the stitching mode, then the central processor 200 follows the "YES" path in FIG. 12a to a step 340 and transmits the ASCII coded message "REMOVE OLD PALLET" to the display 212. As has been previously discussed, the central processor 200 communicates with the keyboard/display controller 208 over the address and data bus 202 in the standard ASCII code. The keyboard/display controller 208 in turn transmits character generator signals over a display bus 216 to the display 212. The message is thereafter displayed in normal fashion on the display 212.

The central processor 200 now asks in step 342 whether the bilevel signal input 260 has switched high indicating removal of the pallet from the pallet handling mechanism 134. If the pallet still remains on the pallet handling mechanism 134, the "NO" path is pursued back to step 340 and the "REMOVE OLD PALLET" message is again transmitted to the display 212. The bilevel signal input 260 will again be addressed by the central processor 200 to ascertain whether or not the input signal has switched logically high indicating the removal of the pallet from the pallet handling mechanism 134. When this finally occurs, the "YES" path is pursued and the central processor 200 transmits ASCII message "THANKS" to the display 212 in a step 344. The central processor 200 now counts on a delay of three seconds in a step 346 and thereafter sets a FLAG A equal to binary one in a step 348. It will be remembered that this sequence of steps assures that the operator will be allowed sufficient time to remove the pallet.

Following the setting of the FLAG A equal to one, the central processor thereafter asks the keyboard/display controller 208 in a step 350 whether or not a "START" has been entered on the keyboard 210. The central processor 200 awaits the "START" signal from the keyboard 210 before following the "YES" path back to step 338. It will be noted that the loop which has just been discussed is premised on the pallet not having been unloaded at the end of the stitching mode. This requires that the machine be again started by the operator as is evidenced by the step 350 requiring a "START" authorization again. This program loop is avoided if the pallet has been previously removed prior to the end of stitching mode. In this regard, the bilevel signal input 260 will be logically high causing a "NO" answer to the inquiry by the central processor 200 in step 338. The "NO" path will hence be followed from the step 338 to a step 352 in FIG. 12a. The step 352 calls for the central processor 200 to ask whether or not the FLAG A is equal to one indicating that three seconds have elapsed following removal of the pallet. It will be remembered that the FLAG A does not indicate a binary one signal condition until three seconds have elapsed so as to allow the operator to remove the pallet. This could still be timing out in the event that the MONITOR program began counting out three seconds towards the end of the stitching mode. In any event, the central processor 200 awaits the setting of the FLAG A equal to one. When this occurs, the central processor in a step 354 issues an EXTEND command signal at the bilevel output 228 of the output port 204. Referring to FIG. 9, the presence of an EXTEND command signal at the bilevel output 228 triggers the solid state relay 240 so as to apply a signal condition to the solenoid 252 which causes the output 154 of the air cylinder 152 to extend. This extension of the output 154 of the air cylinder 152 causes the ejector mechanism 134 to rotate backwardly to its reset position.

The central processor 200 next asks in a step 256 whether the bilevel signal input 262 has switched low. Referring to FIG. 9, it is seen that the bilevel signal input 262 receives a buffered signal from the switch 178 through the buffer circuit 282. The switch 178 closes when the ejector mechanism 134 has moved inward halfway. This closed switch condition will result in the logically low signal state being indicated at the bilevel input 262. When the ejector mechanism has thus been sensed as having moved halfway inwardly, the central processor 200 resets the FLAG A equal to zero in a step 358.

The central processor 200 next issues a RETRACT command signal to the bilevel output 224 of the output port 204 in step 360. This triggers the solid state relay 236 so as to apply a signal condition to the solenoid 248 resulting in the retraction of the output shaft 108 associated with the air cylinder 110. This deactivates the clamping mechanism 66 as has been previously discussed with regard to FIG. 7. Specifically, the wedge 62 is disengaged from the groove 58 of the pallet 22. The pallet now merely lies on the pallet supports 80 and 82 as well as the reference base 96. Referring again to FIG. 12a, the central processor 200 assures that the aforementioned action has occurred by counting out a delay of 100 milliseconds in a step 362 following issuance of the RETRACT command to the bilevel output 224 in step 360. When the delay has thus been timed out, the central processor in a step 364 issues a RETRACT command signal to the bilevel output 226 of the output port 204. Referring to FIG. 9, the RETRACT command signal present at the bilevel output 226 triggers the solid state relay 238 so as to apply an appropriate signal condition to the solenoid 250. This allows the output 129 of the air cylinder 128 to retract so as to cause the cradle 120 housing the heel 118 of the pallet support to move backward in the manner shown in FIG. 7. The toe of the pallet support 80 is moved out from underneath the pallet so as to allow the pallet to drop downward at its front edge.

Referring now to FIG. 12b, it is seen that the flow chart depicted therein is a continuation of the sequential logic illustrated in FIG. 12a. In particular, it is to be noted that the first step of FIG. 12, namely, step 364 is merely a repeat of the last step performed by the central processor 200 in FIG. 12a. The next step 366 to be implemented by the central processor in FIG. 12b is that of asking whether or not the bilevel signal input 260 has switched low. Referring to FIG. 9, it is seen that the bilevel signal input 260 receives a buffered signal from the switch 150. The bilevel signal input will be logically low when the switch 150 has closed. It will be remembered from the discussion of FIG. 8 that the switch 150 is closed when a pallet rests on the pallet ejector mechanism. When this condition occurs, the "YES" path is pursued in FIG. 12b. The central processor 200 next issues a RETRACT command at the bilevel output 228 in a step 368. This RETRACT command present at the bilevel output 228 triggers a solid state relay 240 so as to apply a signal condition to the solenoid 252 which retracts the output shaft 154 of the air cylinder 152 in FIG. 8. This retraction causes the ejector mechanism 134 to move outwardly so as to transport the pallet to a position whereby it may be removed by the operator of the machine. The outward ejection motion is monitored by the central processor 200 in a step 370 which asks whether the bilevel signal input 262 has switched logically high. In this regard, the switch 178 switches open when the pallet ejector mechanism 134 is halfway through its outward motion. When the bilevel signal input 262 has switched high, the central processor 200 issues an EXTEND command to the bilevel output 226 in a step 372. Referring to FIG. 9, this triggers the solid state relay 238 so as to apply a signal condition to the solenoid 250 which extends the output 129 of the air cylinder 128. This causes the cradle 120 to engage the heel 118 of the pallet support so as to move the pallet support 80 back into a reset position. This position illustrated in FIG. 6. The reset position of the pallet support 80 allows a pallet to be supported between the pallet support 80 and the pallet support 82. Referring to step 374 of FIG. 12b, the central processor 200 checks to see whether or not the pallet support 80 is in fact in position. This is accomplished by asking whether or not the bilevel signal input 258 has gone logically low. In this regard, the switch 131 associated with the cradle 120 will have closed when the output shaft 129 is fully extended. When this signal condition occurs, the central processor 200 proceeds "to the EXECUTIVE program". As will be explained in detail hereinafter, the EXECUTIVE program is operative to process a pallet present on the shelves 36 and 38 when a valid stitch pattern file has been assigned to the pallet.

The sensing of a pallet by the aforementioned EXECUTIVE program is premised on a sensing of the pallet identification code. It will be remembered from the discussion of the pallet identification code 44 in FIG. 3 that two separately coded surface areas 46 and 48 are presented underneath a pair of optical sensors in the pallet identification sensor device 50. The coded surface area 46 is sensed by one optical sensor which produces a bilevel signal on the line 52. The coded surface 48 is sensed by the other optical sensor which produces a bilevel signal on the line 53. The coded surfaces 46 and 48 may each either be opaque or reflective. A reflective surface produces a logically high signal condition on the respective line 52 or 53 whereas an opaque surface produces a logically low signal condition. These signal conditions are inverted by the respective buffer circuits 284 and 286 in FIG. 9 so as to produce the reverse signal condition at the bilevel inputs 264 and 266. Attaching a binary one significance to a logically high bilevel signal input and a binary zero to a logically low bilevel signal input results in the following binary significance relative to the coded surfaces 46 and 48:

| Coded Surface 46 (line 52) | Coded Surface 48 (line 53) | Bilevel Signal Input 264 | Bilevel Signal Input 266 |
|---|---|---|---|
| Opaque | Reflective | 1 | 0 |
| Reflective | Opaque | 0 | 1 |
| Reflective | Reflective | 0 | 0 |

As has been previously noted, the condition wherein both areas are non-reflective is reserved for a "no-pallet present" situation. The EXECUTIVE program will attach a numerical significance to each of the above two bit binary code combinations in a manner which will be described hereinafter. The EXECUTIVE program will moreover assure that a particular stitch pattern file is assigned to each thus identified pallet. This assignment of a particular stitch pattern file to a pallet is accomplished through interactive communication with the operator as set forth in the EXECUTIVE program. This as well as other features of the EXECUTIVE program will be more fully appreciated during the description of the program hereinafter. In this regard, the EXECUTIVE program appears in flow chart form in FIGS. 13a, 13b, 13c and 13d. It is to be noted that the last step in each figure is repeated as the first step in the next figure so as to preserve continuity.

Figure 13A:
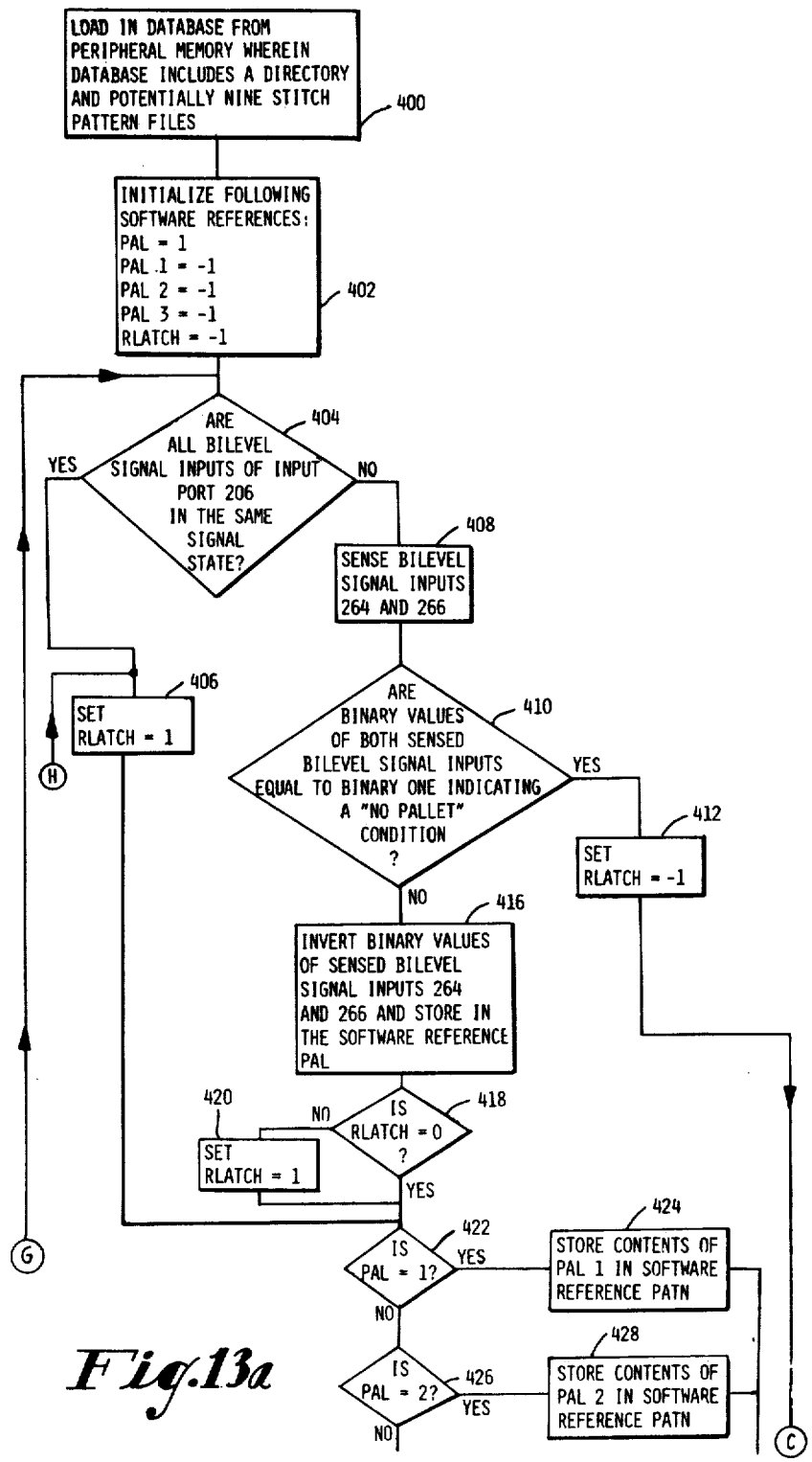
FIGS. 13a-d illustrate the program logic within the computer of FIG. 10 that facilitates the interactive identification of pattern files with respect to pallets entered by the attendant.

Referring to FIG. 13a, the EXECUTIVE program begins with a pre-processing step 400 wherein a database is loaded from a peripheral memory into the main memory of the central processor 200. This peripheral memory preferably consists of a cassette system comprising a cassette transport driven under the control of a cassette controller. Such peripheral memory system is illustrated in FIG. 9. It is noted that the cassette controller 290 communicates with the central processor 200 via the address and data bus 202. Cassette systems having the capability to communicate via an address and data bus with a central processor are well known in the art. The database which is thus loaded into the main memory of the central processor 200 via the bus 202 preferably includes up to nine separate stitch pattern files and a directory for these files. Each stitch pattern file preferably comprises one or more blocks of data wherein a block of data preferably equals 256 eight bit bytes of information. Each block of data contains X and Y motion information for the carriage 24 as well as instructions for the synchronized movement of the sewing needle within the sewing head 20. The directory for the nine stitch pattern files includes at least two bytes of information per file. The first byte is a numerical index for the first block of data of the file. The second byte indicates the number of data blocks that have been allocated to the particular file. It is to be appreciated that the directory will comprise a minimum of only eighteen bytes of information if nine stitch pattern files are to be maintained. Directory information for each numbered stitch pattern file is easily obtained by merely noting where the first directory byte is stored and thereafter counting up in multiples of two to the desired two bytes of directory information.

It is to be understood that while a particular database has been described, various other approaches to organizing the storage of stitch pattern files may also be used with the present invention. For instance, a series of stitch pattern files occupying consecutively addressable storage locations could also be used together with a directory containing the first address for each stitch pattern file and the number of addressable storage locations set aside for that file.

The next step 402 illustrated in FIG. 13a is that of initializing certain software references which are to be used within the program. The first of these software references, namely, PAL is utilized for the purpose of assigning a stitch pattern file to a particular pallet. The next three software references, namely, PAL 1, PAL 2, and PAL 3 are each utilized to associate a particular stitch pattern file with a particular pallet when a stitch pattern file has been assigned. The last software reference, namely, RLATCH is utilized within the EXECUTIVE program as a run authorization. The use of these software references will be more fully understood hereinafter. For the present, it is merely to be noted that a setting of the RLATCH equal to minus one will assure that a run authorization does not occur.

The next step 404 within the EXECUTIVE program is to ask whether all bilevel inputs of input port 206 are logically high. This step is merely asking whether an operative automatic pallet handling system 34 has been connected to the central processor unit 200. In this regard, it is impossible for all bilevel inputs to maintain the same signal state in the event that a pallet handling system is appropriately connected. In this regard, it will be remembered that for instance the signal states of the bilevel inputs 254 and 256 can never be in the same signal state. In other words, the switches 86 and 88 associated with these particular bilevel inputs cannot be both simultaneously closed since they each represent different positions of the left shelf 36. In the event that all bilevel signal states agree, the "YES" path is pursued and the RLATCH reference is set equal to one in a step 406. This setting assures that the machine will not merely run in an automatic mode on the presumption that pallets are being sequenced through a pallet handling system. On the other hand, the machine can be operated in a manual mode in a manner which will be apparent hereinafter. This allows for the manual operation of the machine utilizing the EXECUTIVE program even without a properly functioning pallet handling apparatus or without any pallet handling apparatus.

In the event that an automatic pallet handling system and associated switches is appropriately connected to the input port 206, the "NO" path will be pursued out of step 404 to a step 408. Step 408 requires the central processor 200 to specifically sense the bilevel signal inputs 264 and 266. It will be remembered that a set of logically high signal conditions at both bilevel inputs 264 and 266 indicate that a pallet has not been presented to the pallet identification sensor device 50. In this regard, the central processor 200 is operative to check for this condition in step 410 by asking whether or not the binary values of both bilevel signal inputs are binary one indicating a "NO PALLET" condition. If in fact a pallet has not been registered, then the "YES" path is pursued and the RLATCH is set equal to minus one in a step 412. The setting of the RLATCH equal to minus one assures that a run authorization will not occur later in the program. Specifically, the path downstream of step 412 proceeds to a junction "C" in FIG. 13c. A step 414 in FIG. 13c asks if the RLATCH is equal to zero. A setting of the RLATCH to zero would allow a run authorization to proceed to the PALLET LOAD program as will be explained in detail hereinafter. This is of course avoided by setting the RLATCH equal to minus one in a step 412.

Referring again to step 410 in FIG. 13a, if a pallet is sensed, then the "NO" path is pursued to a next step 416 wherein the binary values of the sensed bilevel signal inputs 264 and 266 are inverted and thereafter stored in the software reference PAL. Referring to the binary values present at the bilevel inputs 264 and 266, it will be remembered that the following combinations of binary zeroes and ones may occur:

| Input 264 | Input 266 |
|---|---|
| 1 | 0 |
| 0 | 1 |
| 0 | 0 |

It is to be appreciated that the inversion accomplished in step 416 will result in the following correspondence between the stored binary in PAL and the bilevel inputs 264 and 266:

| Input 264 | Input 266 | PAL |
|---|---|---|
| 1 | 0 | 01 |
| 0 | 1 | 10 |
| 0 | 0 | 11 |

It is to be appreciated that the above two bits of stored binary in PAL represent numerical values one, two and three in decimal. Accordingly, the stored two bits in PAL will be treated by the programmed central processor 200 as identifying either a pallet 1, pallet 2 or pallet 3. On the other hand, the operator of the machine will recognize a pallet 1, 2 or 3 by the following combinations of coded surfaces:

| Pallet Number | Coded Surface 46 | Coded Surface 48 |
|---|---|---|
| 1 | Opaque | Reflective |
| 2 | Reflective | Opaque |
| 3 | Reflective | Reflective |

It is to be appreciated that the above numerical significance attaching to the coded surfaces 46 and 48 is arbitrary. Other encodings could occur with the ultimate numerical significance attaching to the encodings being decoded as decimal one, two, and three in the PAL software references.

Referring again to FIG. 13a, the central processor proceeds to step 418 and asks for the signal status of RLATCH. If RLATCH is equal to zero, indicating an automatic mode of operation, then the "YES" path is pursued. On the other hand, if the RLATCH is other than zero, then it is set equal to one in step 420. It is to be noted that the path pursued after setting the RLATCH equal to one in step 406 also now converges.

Figure 13B:
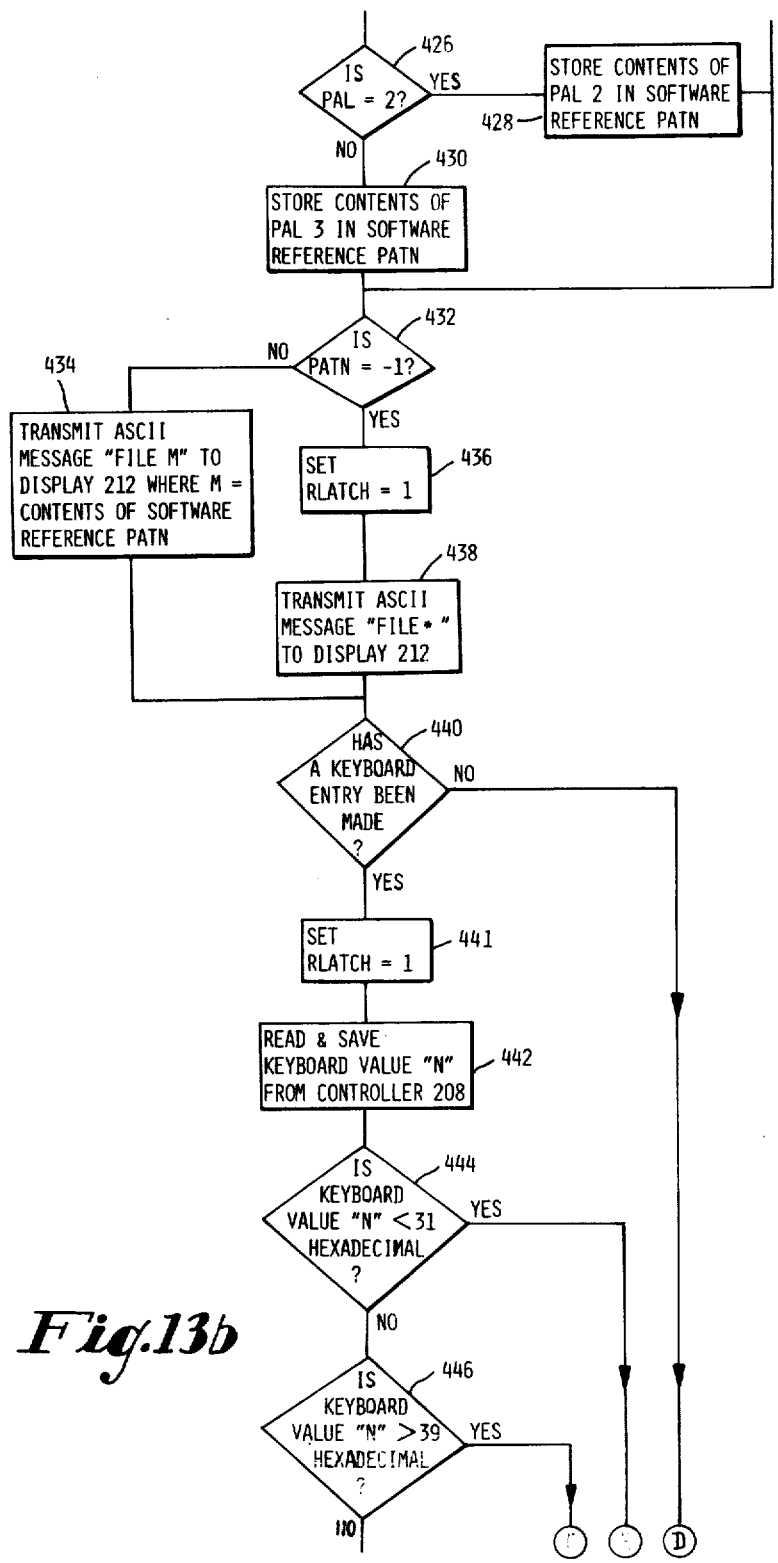

The next sequence of steps is to basically associate the stored numerical pallet code of step 416 with one of the software references PAL 1, PAL 2, or PAL 3. In this regard, step 422 asks whether the bit contents of the software reference PAL are equal to one. If the answer is "YES", then step 424 is pursued and the central processor 200 stores the contents of PAL 1 in a software reference PATN. It is to be appreciated that the contents of PAL 1 will initially be minus one. On the other hand, PAL 1 will ultimately contain a binary representation of a particular file number that will be entered later on in the program. In like manner, steps 426 and 428 ask whether or not the numerical pallet code stored in the software reference PAL is equal to two and if "YES" the bit contents of PAL 2 are stored in the software reference PATN. Referring to FIG. 13b, in the event that a "NO" answer is obtained to the question posed in step 426, then the central processor proceeds to a step 430 and stores the bit contents of PAL 3 in the software reference PATN since this is the only other possible numerical pallet code. At this point in time, the software reference PATN has either the bit contents of PAL 1, PAL 2, or PAL 3 stored therein as a result of steps 422 through 430.

The next step 432 is to ask whether the software reference PATN is equal to minus one. This will in fact be the case initially as none of the software references PAL 1, PAL 2, or PAL 3 will have anything other than a minus one. On the other hand, if a stitch pattern file has been previously assigned to a pallet in a manner which will be described hereinafter, then the "NO" path is pursued out of step 432. In this event, the central processor 200 executes a step 434 wherein an ASCII message is transmitted to the display 212 which begins with the word "FILE" and thereafter the numerical designation "M" which represents the bit contents of the software reference PATN. In this regard, the software reference PATN will have the bit contents of the particular software reference PAL 1, PAL 2, or PAL 3 as a result of steps 424, 428 or 430.

In the event that a stitch pattern file has not been assigned to the sensed pallet, then the "YES" path will be pursued out of step 432. The central processor 200 now sets RLATCH equal to one in step 436 so as to assure that an automatic run will not occur if a file has not in fact been assigned. The central processor next transmits in a step 438 the ASCII message "FILE*" to display 212. This communication to the operator of the machine indicates that a file has not been assigned to the pallet that is thus registered under the sensor 50.

Accordingly, the central processor 200 asks the keyboard display controller 208 whether a keyboard entry has been made on the keyboard 210. This is step 440 in FIG. 13b. It is to be noted that the central processor 200 asks whether or not a keyboard entry has been made regardless of whether or not step 434 has been executed. In this manner, an opportunity is allowed for changing the assigned stitch pattern file which has been previously indicated to the operator in step 434. If a keyboard entry has not been made following display of messages in either steps 434 or 438, then the "NO" path is pursued from step 440 to the step 414 in FIG. 13c. This is reflected in the FIGS. 13b and 13c by the common reference junction "D". Step 414 inquires as to the signal status of the RLATCH. If the RLATCH is equal to zero, then a "YES" path is pursued wherein an automatic stitching of the assigned stitch pattern file is pursued. This will be explained in detail hereinafter.

Referring again to FIG. 13b, if a keyboard entry has in fact been made in step 440, then the central processor 200 is operative to set the RLATCH equal to one in a step 441. The central processor 200 next reads and saves the keyboard value which has been designated "N" in step 442. It will be remembered that the keyboard 210 and the keyboard/display controller 208 are operative to provide ASCII coded signals on the address and data bus 202 to the central processor 200. In this regard, the eight bits of information on the bus 202 will be in the ASCII code. The ASCII code for the numerical key "1" on the keyboard 210 has a hexadecimal value 31 or an eight bit binary code of 00110001. On the other hand, the ASCII code for the numerical key "9" on the keyboard 212 is a hexadecimal value of 39 or an eight bit binary code of 00111001. It is to be appreciated that the ASCII coded hexadecimal values for numerical keys 2 through 8 lie between the hexadecimal values 31 and 39. It is hence to be appreciated that the steps 444 and 446 merely ascertain whether a numerical key 1 through 9 has been depressed or whether any other key has been depressed. In the event that any other key has been depressed, then either the "YES" path out of step 444 or the "YES" path out of step 446 is pursued to the step 414 in FIG. 13c. This logic flow is referenced in FIGS. 13b and 13c by the common reference junctions "E" and "F". It will be remembered that the step 414 inquires as to the signal state of the RLATCH. In this case, the RLATCH will not be in a zero signal condition by virtue of step 441 so that an automatic stitch sequence will not thereafter take place.

Figure 13C:
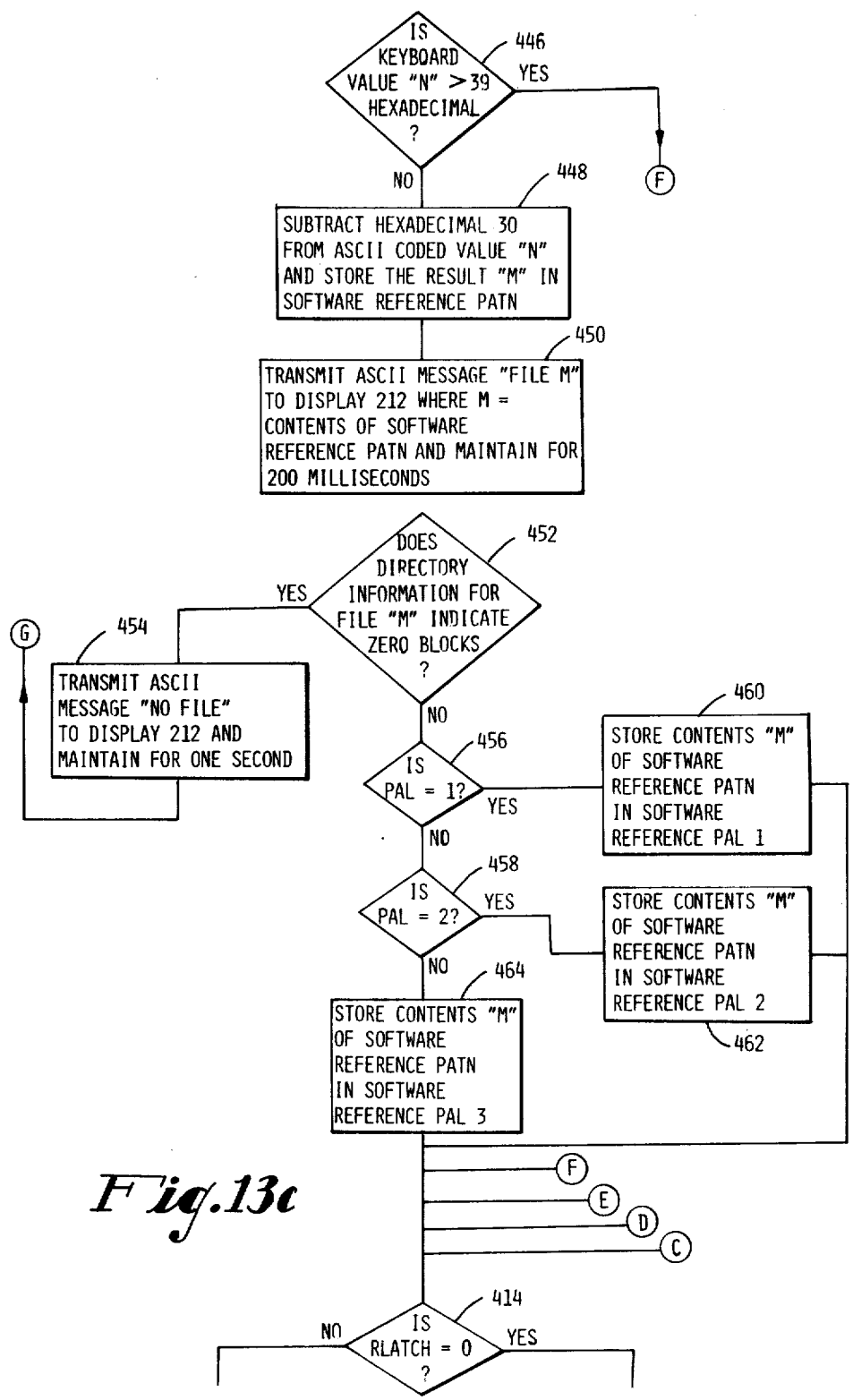

Referring now to FIG. 13c, in the event that a numerical key between 1 and 9 is depressed on the keyboard 210, then the "NO" path will be pursued out of the step 446. The computer will next perform a step 448 wherein the hexadecimal number 30 will be subtracted from the ASCII code value "N" which has been read from the keyboard. The central processor will furthermore store this value in the software reference PATN. This will have the effect of storing the binary value for the numerical entry 1 through 9 in the software reference PATN.

The next step 450 is to transmit an ASCII message "FILE M" to the display 212 wherein "M" represents the contents of the software reference PATN. It is to be noted that step 450 provides for a delay of 450 milliseconds so as to allow the operator to see the message "FIVE M". This communicates to the operator that the numerical key which has been depressed has been acknowledged.

The next step 452 is to ask the directory whether the information for file "M" contained therein indicates zero blocks of data. In this regard, it will be remembered that the directory contains a second byte of information relative to each file which indicates the number of data blocks for the file. If this byte indicates zero data blocks, then there is in fact no pattern file resident within the memory under this file number. In this case, the "YES" path is pursued from step 452 to a step 454. Step 454 transmits an ASCII message of "NO FILE" to the display 212. This message is displayed for at least one second so as to assure that the operator receives the message. The central processor 200 thereafter returns to the step 404 at the beginning of the EXECUTIVE program. The return path is referenced by the common junction reference "G" in FIGS. 13a and 13c.

Referring again to step 452, if the check of the directory for file "M" indicates that a pattern file consisting of a number of blocks does exist, then the "NO" path is pursued. At this point, it has been established that a file does exist in memory for the keyboard entry that has been made in step 442. The numerical value "M" for this identified file has moreover been stored in the software reference PATN in step 448. The EXECUTIVE program now proceeds to transfer the file assignment from the software reference PATN to a dedicated software reference (PAL 1, PAL 2 or PAL 3). This transfer is accomplished by asking in steps 456 and 458 whether the binary code value for the pallet present in the software reference PAL is equal to one in step 456 or equal to two in step 458. In this regard, it will be remembered that the binary value of the numerical code for the sensed pallet will have been stored in the software reference PAL in step 416.

In the event that the binary value is equal to one, then the "YES" path is pursued from step 456 to a step 460. Step 460 stores the contents "M" of the software reference PATN in the software reference PAL 1. On the other hand, if the binary value of the sensed pallet present in the software reference PAL equals two, then the "YES" path is pursued from step 458 to a step 462. Step 462 causes the contents "M" of software reference PATN to be stored in software reference PAL 2. If the answers to both steps 456 and 458 are "NO", then the central processor proceeds to step 464. Step 464 stores the contents "M" of the software reference PATN in the software reference PAL 3. It is thus to be appreciated that as a result of either step 460, 462, or 464, the entered file from the keyboard 210 has been assigned to the respective dedicated software reference for the particular pallet identified as having been presented to the sensor 50. It is to be noted that the paths out of either step 460, 462 or 464 all lead to step 414.

The central processor 200 has now arrived at the step 414 by virtue of having pursued any number of paths. In this regard, it will be remembered that the step 414 is pursued in the event that the step 410 indicates a "NO PALLET" condition. The RLATCH is set equal to minus one in step 412 before pursuing the path denoted by common junction reference "C" to the step 414. It is also to be remembered that the step 414 is pursued in the event that a keyboard entry has not been made in step 440. The "NO" path from step 440 proceeds through the common junction reference "D" to the step 414. The RLATCH will either be zero or binary one depending on various upstream processing from step 440. In particular, the RLATCH will have been set equal to zero only if: a pallet has been loaded, a stitch pattern file has been assigned, and the central processor 200 is executing the EXECUTIVE program in an automatic mode as will be described hereinafter. The RLATCH will otherwise be set equal to binary one by virtue of steps 406, 420, or 436. It is furthermore to be remembered that the step 414 is pursued in the event that a numerical key other than 1 through 9 is entered on the keyboard 212 as determined by steps 444 and 446. The paths from steps 444 and 446 proceed respectively through common junction references "E" and "F". It is to be noted that the RLATCH is equal to one in each instance as a result of step 441. The remaining paths into step 414 are via steps 460, 462 and 464, all of which deal with entering the keyboard entry file number into the appropriate dedicated software reference PAL 1, PAL 2 or PAL 3. It is to be noted that the RLATCH is set equal to one in step 441 for these remaining paths.

In summary, it is to be noted that only one path, namely, the "NO" path from step 440 through junction reference "D" will possibly contain an RLATCH equal to zero. This will hence be the only run authorization path through to the step 414. The actual point at which the RLATCH is set equal to zero will actually first occur downstream of the step 414 in a manner which will be described in detail hereinafter.

Figure 13D:
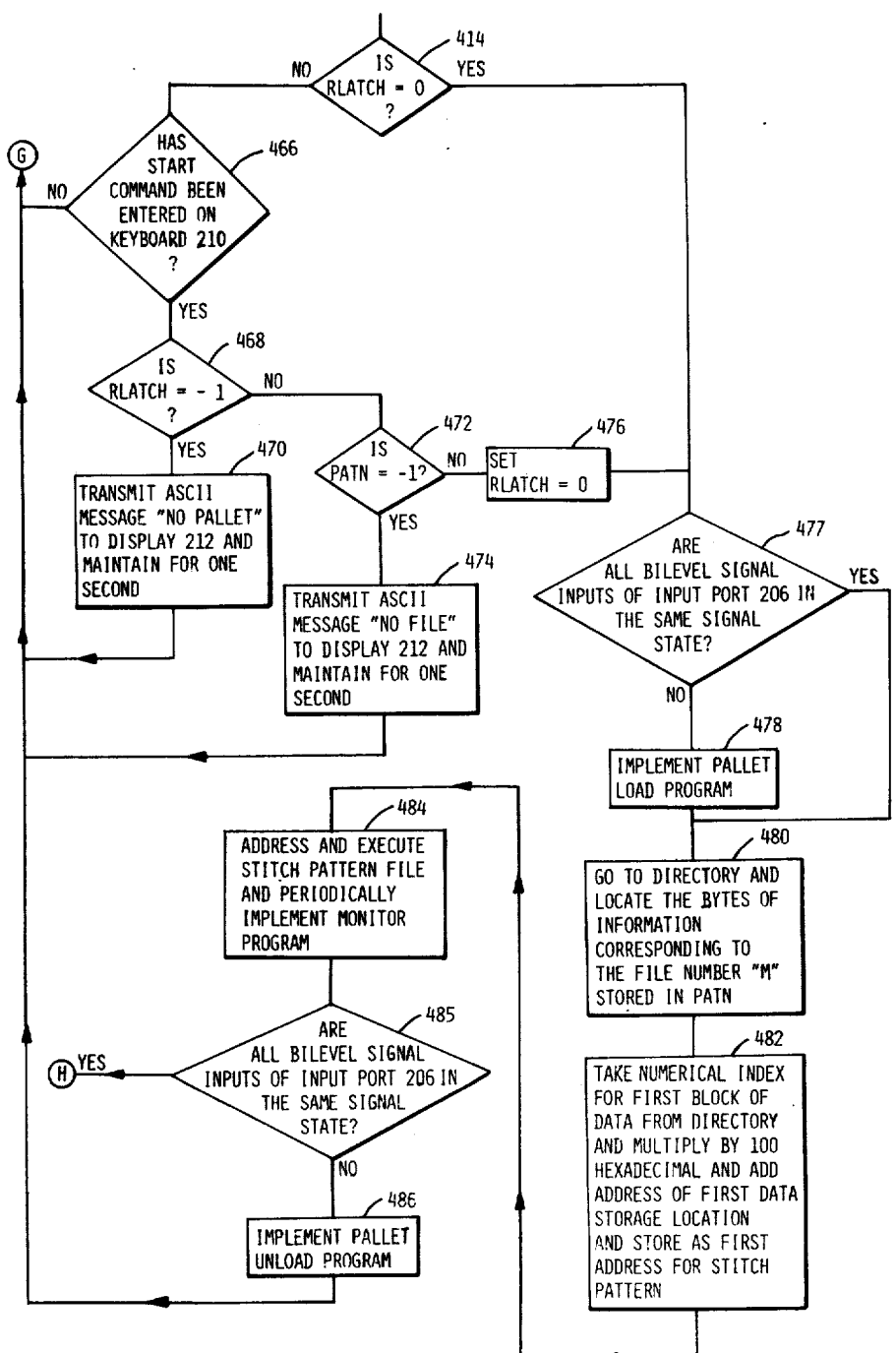

Referring now to step 414 in FIG. 13d, the central processor asks the question as to whether or not the RLATCH is equal to zero. In the event that the RLATCH does not equal zero, the "NO" path is pursued to a step 466 which asks whether or not the "START" command has been entered on the keyboard 210. The "START" command on the keyboard is a key on the keyboard which has an ASCII coded value associated therewith. In order to check the keyboard for this ASCII coded value, it is necessary to first check the value "N" that has been previously read from the keyboard and stored in step 442. In the event that this keyboard value does not indicate a start key, then a further check is merely made of the keyboard controller 208 to assure that a start key has not otherwise been depressed. If a "START" command has not been entered, a path is pursued through common reference junction "G" back to the step 404 of FIG. 13a. In this manner, the program is sequentially executed again and remains in the non-automatic mode.

Referring again to step 466, if a "START" command has been entered on the keyboard 210, then the "YES" path is pursued to a step 468 wherein the central processor 200 asks whether the RLATCH is equal to minus one. It will be remembered that the RLATCH is set equal to minus one in the event that a "NO PALLET" condition is detected in step 410. Hence, when RLATCH is equal to minus one, the "YES" path is pursued out of step 468 to a step 470 wherein an ASCII message of "NO PALLET" is transmitted to the display 212. Step 470 provides from the message to be displayed for at least one second so as to assure that the operator receives the message. This is followed by a return via common reference junction "G" to the step 404 of FIG. 13a wherein the program is again sequentially executed in a non-automatic mode.

Referring again to step 468, if the RLATCH is not equal to minus one, then the "NO" path is pursued to a step 472 which asks whether the software reference PATN is equal to minus one. It will be remembered that the dedicated software references PAL 1, PAL 2, and PAL 3 are each set equal to minus one initially in step 402 and that the software reference PATN is set equal to one of these dedicated software references in steps 424, 428 and 430. The software reference PATN will continue to be minus one until a valid stitch pattern file has been initially assigned in steps 440 to 448. Until this latter event occurs, PATN will continue to equal minus one and step 472 will require a "YES" path to be pursued to a step 474 which transmits the ASCII message "NO FILE" to the display 212. In accordance with the EXECUTIVE program, the central processor returns to the step 404 via common junction reference "G" for further program execution in a non-automatic mode.

Referring again to the step 472, if the software reference PATN is not equal to minus one, then the "NO"

path is pursued to a step 476. It will be remembered that the software reference PATN is set equal to the numerical value "M" of a valid stitch pattern file in step 448 following a validation of the operator's keyboard entry in steps 440 to 446. In this regard, the step 472 is the check following a START authorization that a valid pallet assignment has been initially made by the operator.

Referring to step 476, it is seen that the central processor sets the RLATCH equal to zero. This setting of the RLATCH equal to zero allows the central processor 200 to operate in an automatic mode unless otherwise interrupted. The central processor 200 proceeds to the step 477 after having initially set the RLATCH equal to zero in step 476.

Step 477 merely repeats the question asked in step 404 as to whether all bilevel inputs of input port 206 are in the same signal state. It will be remembered that this step is merely asking whether an operative pallet handling system has been connected to the central processor 200. If an operative pallet system is present, then the bilevel inputs to the input port 206 will not all be in the same signal state as previously discussed relative to step 404. This will result in the central processor 200 pursuing the "NO" path from step 477 to step 478.

Step 478 calls for an implementation of the PALLET LOAD program which has been previously illustrated and discussed as FIG. 10. It will be remembered that this program sequentially operates the pallet handling mechanism 34 so as to drop a pallet from the input load position to the middle position wherein the pallet is mated to the carriage 24 of the X, Y motion control system. When the last step of the PALLET LOAD program is implemented, the central processor moves to step 480 within FIG. 13*d* of the EXECUTIVE program.

It is to be noted that step 480 is directly pursued out of step 477 in the event that an operative pallet handling system is not determined to be present. Specifically, if all bilevel inputs are in the same signal state, then the "YES" path is pursued from step 477 to step 480. As will be explained hereinafter, this allows for the automatic sewing of an assigned stitch pattern file without a pallet handling apparatus being present.

Step 480 causes the central processor 200 to consult the directory and locate the bytes of information corresponding to the file number "M" stored in the software reference PATN. It will be remembered that the directory is organized on the basis of an equal number of information bytes for each stitching pattern file. In this manner, the number of bytes for each file is merely multiplied by the number "M" so as to arrive at the first byte of information for the file "M". It will be remembered that the first byte of directory information for each file is the numerical index for the first block of data associated with the file.

The memory address within the main memory of the central processor 200 is calculated from this numerical index in step 482. Specifically, the numerical index for the first block of data is multiplied by 100 hexadecimal (otherwise known as 258 decimal) and the results are added to the first addressable memory location of the portion of main memory allocated to data. In other words, a normal partitioning of the main memory dictates that storage space first be set aside for needs other than data. The address of the next available storage location would constitute the address of the first addressable memory location of that portion of main memory allocated to data. The computer stores the results of the calculation in 482 as the first address for the stitch pattern. The next step 484 is to execute the stitch pattern file which has thus been located within main memory. It is to be noted that the step 484 also calls for the periodic implementation of the MONITOR program. It will be remembered from FIG. 11 that the MONITOR program checks as to the status of any pallet awaiting removal by the operator from the ejector mechanism. Following the end of the stitching pattern, the central processor 200 immediately moves to a step 485 which asks whether all bilevel signal inputs of input port 206 are in the same signal state. This again is asking the same question as previously asked in steps 404 and 477, namely, is an operative pallet handling apparatus present. In the event that a pallet handling apparatus is not present, the "YES" path is pursued through common junction "H" to step 406 in FIG. 13*a*. Referring to step 406, it is seen that the central processor 200 sets the RLATCH equal to one to assure a non-automatic mode of operation when executing the EXECUTIVE program without a pallet handling apparatus.

Referring again to step 485, it is seen that the "NO" path is pursued in the event that all bilevel signal inputs are not in the same signal state. This path will be taken if an operative pallet handling apparatus is present. The central processor 200 proceeds along the "NO" path to the PALLET UNLOAD program of step 486. This program is illustrated in FIGS. 12*a* and 12*b*. It will be remembered that the execution of the stitch pattern file brings the pallet back to the position within the pallet handling mechanism 34 so as to allow for subsequent unloading. The unloading occurs in the manner dictated by the program steps outlined in FIGS. 12*a* and 12*b*. At the end of the PALLET UNLOAD program, the central processor 200 again returns through common junction "G" to step 404 in FIG. 13*a*. At this point, the operator will most likely have loaded another pallet which can be sensed by the pallet identification sensor 50. This will result in the "NO" path being pursued out of the step 410 in FIG. 13*a*. The central processor 200 continues in the automatic mode through step 416 wherein the sensed pallet code is converted to a numerical value and on through step 418 wherein the "YES" output path is taken. The central processor next associates the numerical value of the sensed pallet code obtained from step 416 with one of the dedicated software references PAL 1, PAL 2 or PAL 3. This is accomplished in either step 422 or step 426. The previously assigned stitch pattern file resident in the dedicated software reference that has been thus identified is stored in the software reference PATN in either step 424, 428 or 430. The central processor 200 proceeds from either step 424, 428 or 430 through to step 432. If a stitch pattern file has been identified, the "NO" path is pursued to a step 434 wherein the numerical file number is displayed on the display 212. If this file number is not changed by the operator of the machine, the central processor 200 will pursue the "NO" path out of the step 440. This leads to step 414 via the common reference junction "D". Since the automatic mode has not been interrupted, the RLATCH remains equal to zero and the "YES" path is pursued out of step 414 to step 477. Step 477 notes that automatic pallet handling is present so as to require execution of the PALLET LOAD program of step 478. The stitch pattern file is accessed from main memory and thereafter executed in accordance with steps 480 through 484. The central processor proceeds to step 485 and again notes that automatic pallet handling is present so as to require execution of the PALLET UNLOAD program in step 486. The completed pallet is thereafter unloaded and the central processor 200 returns through common junction "G" to the beginning of the EXECUTIVE program. This automatic processing of pallets will continue until such time as either a pallet is not timely loaded by the operator so as to be sensed following the completion of the stitching of the previous pallet or until such time as a pallet is not appropriately removed at the "EJECT" position. In this latter instance, the PALLET UNLOAD program of FIGS. 12*a* and 12*b* will interrupt the automatic sequence and request a "START" authorization from the operator.

It is also to be noted that the operator can change the stitch pattern file assignment by not loading a pallet into the input position prior to completion of the PALLET UNLOAD program. In this regard, the operator can change the stitch pattern file assignment by entering a different file number on the keyboard 210 prior to step 440. The EXECUTIVE program will note if the changed pattern file assignment is valid in steps 442 through 452 and thereafter store the same in the appropriate dedicated software reference PAL 1, PAL 2 or PAL 3. This latter storage in the appropriate dedicated software reference occurs in steps 456 through 464. The EXECUTIVE program will then cycle through step 414 and await a START authorization from the operator in step 466. In this regard, the RLATCH will have been previously set equal to one in step 441 requiring the "NO" path to be pursued out of step 414 to the step 466. It is to be noted that the START authorization will always be required in step 466 following a file assignment by the operator.

It is to be furthermore noted that the machine can be operated without a pallel handling apparatus. Referring to step 404, it is seen that the "YES" path is pursued in the event that an operative pallet handling apparatus is not initially found by the central processor 200. The RLATCH is set equal to one in step 406 and the central processor next inquires in step 422 as to whether the software reference PAL equals one. It will be remembered that the initial status of the software reference PAL is set equal to one in step 402. The status of the software reference PAL will result in the "YES" path being pursued from step 422 to step 424. The central processor 200 now stores the initially set minus one status of the dedicated software reference PAL 1 in the software reference PATN. This leads to a step 432 wherein the minus one status of the software reference PATN dictates that the "YES" path be pursued to step 436 wherein the RLATCH is redundantly set equal to one and the message "FILE*" is transmitted to the operator. This will continue to occur until a valid keyboard entry has been made by the operator as defined by the steps 440 to 448. Step 448 will result in the numerical value of the valid keyboard entry identifying a stitch pattern file being stored in the software reference PATN. In the event that the operator agrees with the keyboard entry as required by step 450, the central processor 200 proceeds to verify that such a stitch pattern file exists in memory. If a stitch pattern file exists in memory, the file number "M" is stored in the dedicated software reference PAL 1 and the central processor 200 proceeds to step 414. Since the RLATCH equals one, the "NO" path is pursued from step 414 to step 466. The central processor 200 awaits a START command from the operator before proceeding through the step 468 to the step 472. If a valid stitch pattern has been previously entered and verified, then the software reference PATN will not equal minus one and the "NO" path will be pursued through the run authorization step 476. At this time, the central processor 200 inquires in step 477 as to whether an operative pallet handling apparatus is present. Since there isn't, the "YES" path is pursued from step 477 to step 480 which in conjunction with step 482 locates the identified stitch pattern file in memory. The stitch pattern file is thereafter accessed and executed in step 484. Following completion of the stitch pattern, the central processor again notes that an operative pallet handling apparatus is not present in step 485. This results in the "YES" path being pursued through common junction "H" back to step 406 which again sets the RLATCH equal to one. This will again dictate a non-automatic mode of operation. If the operator has manually or otherwise clamped another pallet into place, then the previously assigned stitch pattern will again be sewn on the workpiece contained within the clamped pallet. This will occur when the operator again enters a START command as is required in a non-automatic mode. It is of course to be noted that the operator can change the file assignment by making an appropriate keyboard entry before entering the START command.

From the foregoing, it is to be appreciated that a preferred embodiment of an interactive communication system in association with automatically controlled pallet handling apparatus has been herein disclosed. It is to be appreciated that alternative logic in the interactive communication system and in the automatic control of the pallet handling apparatus may be substituted for elements of the preferred embodiment without departing from the scope of the invention. It is furthermore to be noted that the pallet handling apparatus disclosed herein is the subject matter of a separately filed U.S. Pat. No. 4,422,393 entitled, "Sewing Machine Having Automatic Pallet Handling", filed in the names of Herbert Johnson, Richard M. Elliott, Donald F. Herdeg and Alan M. Peck on even date herewith.

What is claimed is:

1. In an automatic sewing machine wherein predefined stitch patterns are automatically sewn on workpieces, a system for selecting and assigning the stitch patterns to the workpieces comprising:
    means for entering a stitch pattern assignment for a workpiece that is to be sewn;
    means, responsive to the entry of a stitch pattern assignment, for verifying that the assignment is valid;
    means, for storing the verified stitch pattern assignment so as to allow the verified stitch pattern assignment to be recalled; and
    means for automatically sewing the stitch pattern associated with the stitch pattern assignment.

2. The system of claim 1 further comprising:
    means for transmitting a message indicating the stitch pattern which is to be run before automatically sewing the stitch pattern.

3. The system of claim 1 further comprising:
    means for requiring a start authorization following the entry of a stitch pattern assignment.

4. The system of claim 1 further comprising:
    means, responsive to said verifying means, for transmitting a message indicating when an invalid file assignment has been entered.

5. The system of claim 1 further comprising:
means for changing a stored stitch pattern assignment in response to the entry of a new valid stitch pattern assignment.

6. The system of claim 1 further comprising:
means, responsive to the verification of a valid stitch pattern assignment, for switching to an automatic mode so as to thereafter automatically recall the assigned stitch pattern.

7. The system of claim 1 wherein a workpiece is prearranged within a workpiece holder and wherein said means for automatically sewing comprises:
means for positioning a workpiece holder relative to a reciprocating sewing needle within the automatic sewing machine; and
means for automatically attaching a workpiece holder to said positioning means in the event that a valid stitch pattern assignment has been entered for the workpiece.

8. The system of claim 7 further comprising:
means for automatically detaching the workpiece holder from the positioning means upon completion of the stitch pattern.

9. The system of claim 8 further comprising:
means for automatically engaging and moving the detached workpiece holder to a location which allows another workpiece holder to be automatically attached to said positioning means.

10. The system of claim 9 further comprising:
means for monitoring the presence of a workpiece holder on said engaging and moving means; and
means, responsive to said monitoring means, for resetting said engaging and moving means after a predefined period of time has elapsed following removal of the workpiece holder from said engaging and moving means.

11. The system of claim 10 further comprising:
means, responsive to said monitoring means for activating said means for automatically detaching the workpiece holder from said positioning means, said activating means being operative to delay any detachment of the workpiece holder until the resetting of said moving and engaging means.

12. The system of claim 7 further comprising:
means for receiving a workpiece holder at a location above said positioning means; and
means for dropping a received workpiece holder to a location relative to said positioning means whereby the workpiece holder can be thereafter attached to said positioning means.

13. The system of claim 12 further comprising:
means, affixed to said positioning means, for supporting the dropped workpiece holder from said receiving means prior to the attachment of the workpiece holder to said positioning means.

14. The system of claim 13 further comprising:
means for releasing said supporting means following the completion of running the stitch pattern.

15. The system of claim 12 wherein the workpiece holder includes a coding, said system further comprising:
means for sensing the code present on the workpiece holder when held by said receiving means; and
means, responsive to the sensing of the code for, accessing a previously assigned stitch pattern associated with the sensed code.

16. The system of claim 15 further comprising:
means, responsive to the sensing of the code, for transmitting a message as to no stitch pattern assignment having been made if a stitch pattern assignment has not been previously associated with the sensed code.

17. The system of claim 16 wherein said means for storing the verified stitch pattern assignment comprises:
means for storing a verified stitch pattern assignment in association with the sensed code so as to allow the verified stitch pattern assignment to be recalled each time a workpiece bearing the particular code is placed within said receiving means.

18. The system of claim 17 further comprising:
means for switching to an automatic mode so as to automatically select the assigned stitch pattern associated with the particular code each time the particular code is thereafter sensed by said sensing means.

19. The system of claim 17 further comprising:
means for changing the stored stitch pattern assignment in association with a particular code in response to the entry of a new valid stitch pattern assignment having been made while the particular code is being sensed by said sensing means.

20. The system of claim 19 further comprising:
means for switching to an automatic mode so as to automatically select the assigned stitch pattern associated with the particular code each time the particular code is thereafter sensed by said sensing means.

21. The system of claim 12 further comprising:
means for detecting when a workpiece holder is not present within said receiving means; and
means, responsive to the detection of a workpiece holder not being present, for switching to a nonautomatic mode requiring receipt of a start authorization thereafter.

22. The system of claim 1 wherein each workpiece includes a code associated therewith, said system further comprising:
means for sensing the code associated with each particular workpiece; and
means, responsive to the sensing of the code, for accessing a previously assigned stitch pattern associated with the sensed code.

23. The system of claim 22 further comprising:
means, responsive to the sensing of the code, for transmitting a message as to no stitch pattern assignment having been made if a stitch pattern has not been previously associated with the sensed code.

24. The system of claim 23 wherein said means for storing the verified stitch pattern assignment comprises:
means for storing a verified stitch pattern assignment in association with the sensed code so as to allow the verified stitch pattern assignment to be recalled each time a workpiece associated with the particular code is presented for sewing.

25. The system of claim 24 further comprising:
means for switching to an automatic mode so as to automatically select the assigned stitch pattern associated with the particular code each time the particular code is thereafter sensed by said sensing means.

26. In an automatic sewing machine, a system for automatically processing a plurality of workpieces that are to have predefined stitch patterns sewn thereon, said system comprising:

means for automatically identifying each workpiece requiring a different stitch pattern to be sewn thereon;

means for assigning a different stitch pattern to each such identified workpiece utilizing the automatic identification of the workpiece in conjunction with a communication identifying the different stitch pattern, the communication having been received from a means for identifying particular stitch patterns; and means for automatically associating the previously assigned stitch pattern with a particularly identified workpiece each time the particularly identified workpiece is thereafter presented for sewing.

27. The system of claim 26 wherein each workpiece requiring a different stitch pattern is held within a workpiece holder having a particular coding and wherein said means for automatically identifying each workpiece requiring a different stitch pattern comprises:
means for sensing the code present on a workpiece holder.

28. The system of claim 26 wherein said means for assigning a different stitch pattern to each such identified workpiece further comprises:
means for automatically verifying that the communication identifying the different stitch pattern is an accordance with a previously defined manner of identifying stitch patterns; and
means for transmitting a communication to the operator of the machine if the communication identifying the different stitch pattern is not in accordance with the previously defined manner of identifying stitch patterns.

29. The system of claim 28 wherein said means for assigning a different stitch pattern further comprises:
means for automatically checking as to the existence of the identified stitch pattern; and
means for transmitting a communication to the operator if the stitch pattern does not exist.

30. The system of claim 27 wherein said means for assigning a different stitch pattern to each such identified workpiece comprises:
means for associating the sensed code present on the workpiece holder with the particular stitch pattern that has been identified via a communication from said means for identifying particular stitch patterns.

31. The system of claim 26 wherein said means for automatically identifying each workpiece requiring a different stitch pattern to be sewn thereon comprises:
means for automatically identifying each workpiece;
means for checking as to the previous assignment of a stitch pattern to the automatically identified workpiece;
means for transmitting a communication if a stitch pattern has not been previously assigned to the automatically identified workpiece.

32. The system of claim 30 wherein said means for automatically associating the previously assigned stitch patterns with each particularly identified workpiece comprises:
means for sensing the code present on a workpiece holder containing a workpiece that is to be sewn; and
means for matching the sensed code with the stitch pattern previously associated with the code.

33. The system of claim 30 further comprising:

means for awaiting a start authorization from the operator in the event that an identified stitch pattern exists; and
means for switching to an automatic mode of operation following the start authorization.

34. The process of claim 26 further comprising the steps of:
determining the presence of apparatus for simultaneously handling a plurality of workpieces; and
awaiting a start authorization each time a workpiece is to be sewn in the event that the apparatus for simultaneously handling a plurality of workpieces is determined not to be present.

35. The system of claim 26 wherein each workpiece is prearranged in a workpiece holder, said system further comprising:
means for automatically attaching a workpiece holder to a positioning system after the workpiece contained therein has been automatically associated with a stitch pattern, the positioning system being operative to thereafter position the workpiece holder underneath a reciprocating sewing needle so as to execute the assigned stitch pattern on a workpiece held within the workpiece holder.

36. The system of claim 35 further comprising:
means for automatically detaching the workpiece holder containing the sewn workpiece following completion of the assigned stitch pattern.

37. The system of claim 36 further comprising:
means for automatically moving the detached workpiece holder containing the sewn workpiece to an eject position so as to allow for the subsequent attachment of another workpiece holder before any manual handling is necessary of the detached workpiece holder containing the sewn workpiece.

38. The system of claim 37 further comprising:
means for monitoring the manual removal of the detached workpiece holder containing the sewn workpiece from the eject position.

39. The system of claim 38 further comprising:
means for delaying any further detachment of a workpiece holder from the automatic positioning system following completion of a stitch pattern until a predefined period of time has elapsed following the monitored manual removal of the workpiece holder containing the workpiece then present at the eject position.

40. The system of claim 38 wherein said means for automatically moving the detached workpiece holder containing the sewn workpiece is an ejector mechanism, said system further comprising:
means for resetting the ejector mechanism only after a predefined period of time has elapsed following the monitored removal of the workpiece holder containing the sewn workpiece.

41. The system of claim 37 further comprising:
means for automatically dropping a workpiece holder containing a workpiece to be sewn to a location for attachment to the positioning system.

42. The system of claim 41 wherein said means for automatically dropping the workpiece holder containing a workpiece to be sewn is responsive to:
means for sensing a code present on the workpiece holder containing the workpiece to be sewn; and
means for verifying that a stitch pattern has been assigned to the sensed code.

43. A process for automatically sewing predefined stitch patterns on a plurality of workpieces comprising the steps of:
   sensing an identification associated with each workpiece that is to be sewn;
   verifying that a stitch pattern assignment has been made in response to the sensing of the identification associated with each workpiece;
   accessing an assigned stitch pattern indicated by the stitch pattern assignment in response to the verification that a stitch pattern assignment has been made; and
   automatically sewing the assigned stitch pattern on the workpiece.

44. The process of claim 43 further comprising the step of:
   transmitting a communication as to no stitch pattern assignment having been made in response to said verification step indicating the lack of a stitch pattern assignment.

45. The process of claim 44 further comprising the steps of:
   awaiting a stitch pattern assignment for the sensed identification associated with the workpiece to be sewn; and
   verifying the validity of the stitch pattern assignment when made.

46. The process of claim 45 further comprising the steps of:
   transmitting a communication as to an invalid stitch pattern assignment in the event that a received stitch pattern assignment is invalid; and
   transmitting a communication indicating when a valid stitch pattern assignment has been made.

47. The process of claim 46 further comprising the steps of:
   awaiting a start authorization following verification of a valid stitch pattern assignment; and
   switching to an automatic mode following receipt of start authorization whereby workpieces are automatically sewn until a workpiece is sensed wherein a stitch pattern has not been previously assigned thereto.

48. The process of claim 45 further comprising the steps of:
   awaiting a start authorization following verification of a valid stitch pattern assignment; and
   switching to an automatic mode following receipt of start authorization whereby workpieces are automatically sewn until a workpiece is sensed wherein a stitch pattern has not been previously assigned thereto.

49. The process of claim 43 wherein each workpiece is prearranged in a workpiece holder and wherein said step of sensing an identification associated with each workpiece comprises the step of:
   sensing a code present on each workpiece holder.

50. The process of claim 49 wherein said step of verifying that a stitch pattern assignment has been made comprises the step of:
   verifying that a stitch pattern assignment has been made in response to the sensing of a code present on a workpiece holder.

51. The process of claim 50 further comprising the step of:
   automatically attaching the workpiece holder to a positioning system following verification that a stitch pattern assignment has been made.

52. The process of claim 51 further comprising the step of:
   automatically detaching the workpiece holder containing the sewn workpiece following completion of the assigned stitch pattern.

53. The process of claim 52 further comprising the step of:
   automatically moving the detached workpiece holder containing the sewn workpiece to an eject position so as to allow for the subsequent attachment of another workpiece holder before any manual handling is necessary of the detached workpiece holder containing the sewn workpiece.

54. The process of claim 53 further comprising the step of:
   monitoring the manual removal of the detached workpiece holder containing the sewn workpiece from the eject position.

55. The process of claim 54 wherein said step of automatically moving the detached workpiece holder containing the sewn workpiece is implemented by an ejector mechanism, said process further comprising the step of:
   resetting the ejector mechanism only after a predefined period of time has elapsed following the monitored removal of the detached workpiece holder containing the sewn workpiece.

56. The process of claim 43 wherein each workpiece is prearranged in a workpiece holder said process further comprising the step of:
   automatically attaching a workpiece holder to a positioning system following the sensing of the identification associated with each workpiece, the positioning system being thereafter operative to automatically position the workpiece underneath a reciprocating needle in response to said step of automatically sewing the assigned stitch pattern.

57. The process of claim 56 further comprising the step of:
   automatically detaching the workpiece holder containing the sewn workpiece following completion of the assigned stitch pattern.

58. The process of claim 57 further comprising the step of:
   automatically moving the detached workpiece containing the sewn workpiece to an eject position so as to allow for the subsequent attachment of another workpiece holder before any manual handling is necessary of the detached workpiece holder containing the sewn workpiece.

59. The process of claim 58 further comprising the step of:
   monitoring the manual removal of the detached workpiece holder containing the sewn workpiece from the eject position.

60. The process of claim 57 wherein said step of automatically moving the detached workpiece holder containing the sewn workpiece is implemented by an ejector mechanism, said process further comprising the step of:
   resetting the ejector mechanism only after a predefined period of time has elapsed following the monitored removal of the detached workpiece holder containing the sewn workpiece.

61. The process of claim 60 further comprising the step of:
   automatically moving a workpiece holder containing a workpiece to be sewn from a first location to a second location for attachment to the positioning system.

62. A system for automatically sewing predefined stitch patterns on a plurality of workpieces wherein the workpieces are prearranged in one or more coded pallets, said system comprising:
means for sensing the code present on a coded pallet;
means for accessing a stitch pattern assigned to the particularly sensed code in response to the sensing of the code present on the coded pallet; and
means for automatically sewing the assigned stitch pattern on the workpiece.

63. The system of claim 1 further comprising: means for verifying that a stitch pattern assignment has been made in response to the sensing of the identification appearing in association with each workpiece holder.

64. The system of claim 63 further comprising:
means for transmitting a communication as to no stitch pattern assignment having been made in response to said verification means indicating the lack of a stitch pattern assignment.

65. The system of claim 54 further comprising:
means for entering a stitch pattern assignment for a group of workpieces;
means for verifying the validity of the stitch pattern assignment; and
means for storing the verified stitch pattern assignment in conjunction with a sensed identification appearing in association with a workpiece holder for the group of workpieces.

66. The system of claim 65 wherein said means for verifying the validity of the entered stitch pattern assignment comprises:
means for verifying the existence of a particular stored stitch pattern that is to be accessed as the assigned stitch pattern.

67. The system of claim 66 further comprising:
means for transmitting a communication indicating the non-existence of the particular stitch pattern when the stored existence of the particular stitch pattern cannot be verified.

68. The system of claim 65 wherein the entered stitch pattern assignment is a numerical entry and wherein said means for verifying the validity of the entered stitch pattern assignment comprises:
means for verifying that the numerical entry is within a specified numerical range.

69. The system of claim 68 further comprising:
means for transmitting a communication indicating the non-existence of a stitch pattern when the numerical entry is not within the specified range.

70. The system of claim 65 further comprising:
means for transmitting a communication as to an invalid stitch pattern assignment in the event that an entered stitch pattern assignment is invalid.

71. The system of claim 65 further comprising:
means for entering a start authorization following verification of a valid stitch pattern assignment; and
means for switching to an automatic mode following receipt of start authorization whereby workpieces are automatically sewn until a workpiece is sensed wherein a stitch pattern has not been previously assigned thereto.

72. The system of claim 62 further comprising:
means for verifying that a stitch pattern assignment has been made in response to the sensing of a code present on a coded pallet.

73. The system of claim 72 further comprising:
means for automatically attaching the coded pallet to a positioning system following verification that a stitch pattern assignment has been made.

74. The system of claim 73 further comprising:
means for automatically detaching the pallet containing the sewn workpiece following completion of sewing the assigned stitch pattern.

75. The system of claim 74 further comprising:
means for automatically moving the detached pallet containing the sewn workpiece to an eject position so as to allow for the subsequent attachment of another pallet before any manual handling is necessary of the detached pallet containing the sewn workpiece.

76. The system of claim 75 further comprising:
means for monitoring the manual removal of the detached pallet containing the sewn workpiece from the eject position.

77. The system of claim 76 wherein said means for automatically moving the detached pallet containing the sewn workpiece comprises an ejector mechanism, said system further comprising:
means for resetting the ejector mechanism only after a predefined period of time has elapsed following the monitored removal of the detached pallet containing the sewn workpiece.

78. The system of claim 62 further comprising:
means for entering a stitch pattern assignment in conjunction with the sensed code;
means for verifying the validity of the entered stitch pattern assignment; and
means for storing the verified stitch pattern assignment in conjunction with the sensed code.

79. The system of claim 78 wherein said means for verifying the validity of the entered stitch pattern assignment comprises:
means for verifying the existence of a particular stored stitch pattern that is to be accessed as the assigned stitch pattern.

80. The system of claim 79 further comprising:
means for transmitting a communication indicating the non-existence of the particular stitch pattern when the stored existence of the particular stitch pattern cannot be verified.

81. The system of claim 78 wherein the entered stitch pattern assignment is a numerical entry and wherein said means for verifying the validity of the entered stitch pattern assignment comprises:
means for verifying that the numerical entry is within a specified numerical range.

82. The system of claim 81 further comprising:
means for transmitting a communication indicating the non-existence of a stitch pattern when the numerical entry is not within the specified range.

83. A process for assigning stitch patterns to a plurality of workpieces that are to be automatically processed and sewn, said process comprising the steps of:
sensing a code present on a workpiece holder containing a workpiece that is to be sewn;
awaiting the selection of a stitch pattern that is to be sewn on the workpiece;
verifying that the selection of the stitch pattern is valid;
awaiting a start authorization following said step of verifying the selection of the stitch pattern; and
repetitively automatically sewing the selected stitch pattern associated with the sensed code each time the same coded workpiece holder is presented to the sewing machine.

84. The process of claim 83 further comprising the step of:
automatically moving the coded workpiece holder from an input position to a second position following verification that a valid stitch pattern assignment has been made.

85. The process of claim 83 further comprising the step of:
moving a workpiece holder from the second position to an output position following completion of the automatic sewing.

86. The process of claim 85 further comprising the step of:
monitoring the output position to ascertain whether a previous workpiece holder still occupies the output position; and
moving the workpiece holder from the second position to the output position when said step of monitoring the output position indicates that a previous workpiece holder has been removed for a predefined period of time.

87. The process of claim 86 further comprising the step of:
switching to a non-automatic mode of operation whereby a start authorization is again required if a previous workpiece holder is not removed from the output position following the completion of sewing a workpiece in the second position.

88. The process of claim 86 further comprising the step of:
sensing the presence of a workpiece holder in the input position; and
switching to a non-automatic mode if a workpiece holder is not present at the input position.

89. A process for automatically sewing one or more predefined stitch patterns on a plurality of workpieces wherein the plurality of workpieces are arranged into one or more groups according to which of the predefined stitch patterns are to be sewn thereon and wherein the workpieces are prearranged within workpiece holders prior to being sewn, said process comprising the steps of:
providing a plurality of identifications on the workpiece holders each of which can be associated with a respective group of the workpieces so as to thereby identify the group to which a particular workpiece being held within a workpiece holder belongs;
automatically sensing the identification on the workpiece holder containing the workpiece that is to be sewn;
accessing an assigned stitch pattern in response to the sensing of the identification on the workpiece holder; and
automatically sewing the assigned stitch pattern on the workpiece.

90. The process of claim 89 wherein the identification associated with each group of workpieces is a separate code for each group appearing on at least one workpiece holder so that said step of sensing the identification on the workpiece holder containing the workpiece comprises the step of:
sensing the code present on the workpiece holder so as to thereby identify the group to which the workpiece belongs.

91. The process of claim 90 wherein the code for each group resides at the same location on each workpiece holder and wherein said step of automatically sensing the code present on the workpiece holder comprises:
locating each workpiece holder at the same location relative to a stationary sensor which senses the code.

92. The process of claim 90 wherein the separate code for each group is a unique combination of reflective and non-reflective surfaces on the workpiece holder that are optically sensed during said step of automatically sensing the code.

93. The process of claim 89 further comprising the step of:
verifying that a stitch pattern assignment has been made in response to the sensing of the identification on the workpiece holder containing the workpiece, said verification being necessary before proceeding to said step of accessing an assigned stitch pattern.

94. The process of claim 93 further comprising the step of:
transmitting a communication as to no stitch pattern assignment having been made in response to said verification step indicating the lack of a stitch pattern assignment.

95. The process of claim 94 further comprising the steps of:
awaiting a stitch pattern assignment for the sensed identification on the workpiece holder containing the workpiece to be sewn; and
verifying the validity of the stitch pattern assignment when made.

96. The process of claim 95 further comprising the steps of:
transmitting a communication as to an invalid stitch pattern assignment in the event that a received stitch pattern assignment is invalid; and
transmitting a communication indicating when a valid stitch pattern assignment has been made.

97. The process of claim 96 further comprising the steps of:
awaiting a start authorization following verification of a valid stitch pattern assignment; and
switching to an automatic mode following receipt of the start authorization whereby workpieces are automatically sewn until a workpiece is sensed wherein a stitch pattern has not been previously assigned thereto.

98. The process of claim 95 further comprising the steps of:
awaiting a start authorization following verification of a valid stitch pattern assignment; and
switching to an automatic mode following receipt of start authorization whereby workpieces are automatically sewn until a workpiece is sensed wherein a stitch pattern has not been previously assigned thereto.

99. A system for automatically sewing one or more predefined stitch patterns on a plurality of workpieces wherein the plurality of workpieces are arranged into one or more groups according to which of the predefined stitch patterns are to be sewn thereon and each group is given a separate identification that can be automatically sensed, the identification appearing in association with at least one workpiece holder for holding a workpiece belonging to the group, said system comprising:

means for automatically sensing the identification appearing in association with each workpiece holder so as to thereby identify the group to which the workpiece being held therein belongs;

means for accessing an assigned stitch pattern in response to the sensing of the identification appearing in association with each workpiece holder; and means for automatically sewing the assigned stitch pattern on the workpiece.

100. The system of claim 99 wherein the identification appearing in association with at least one workpiece holder for that group is a separate code for each group appearing on each workpiece holder for that group so that said means for automatically sensing the identification appearing in association with each workpiece holder comprises:

means for automatically sensing the code present on the workpiece holder so as to thereby identify the group to which the workpiece belongs.

101. The system of claim 100 wherein the code for each group resides at the same location on each workpiece holder and wherein said means for automatically sensing the code present on the workpiece holder comprises:

a stationary sensor; and means for locating each workpiece holder relative to said stationary sensor.

102. The system of claims 100 or 101 wherein the separate code for each group is a combination of reflective and non-reflective surfaces on the workpiece holder that are optically sensed by said means for automatically sensing the code.

* * * * *

UNITED STATES PATENT AND TRADEMARK OFFICE
CERTIFICATE OF CORRECTION

PATENT NO. : 4,479,446

DATED : October 30, 1984

INVENTOR(S) : Herbert Johnson et al

It is certified that error appears in the above-identified patent and that said Letters Patent is hereby corrected as shown below:

Column 35, line 13, "claim 1" should read -- claim 99 --.

Column 35, line 22, "claim 54" should read -- claim 64 --.

Signed and Sealed this

Eighth Day of October 1985

[SEAL]

Attest:

DONALD J. QUIGG

Attesting Officer

Commissioner of Patents and Trademarks—Designate